US009639518B1

(12) United States Patent
Goodspeed et al.

(10) Patent No.: US 9,639,518 B1
(45) Date of Patent: May 2, 2017

(54) IDENTIFYING ENTITIES IN A DIGITAL WORK

(75) Inventors: Joshua M. Goodspeed, Seattle, WA (US); Janna S. Hamaker, Seattle, WA (US); Adam J. Iser, Mercer Island, WA (US); Tom Killalea, Seattle, WA (US); Abhishek Patnia, Seattle, WA (US); Alla Taborisskaya, Bothell, WA (US)

(73) Assignee: Amazon Technologies, Inc., Seattle, WA (US)

( * ) Notice: Subject to any disclaimer, the term of this patent is extended or adjusted under 35 U.S.C. 154(b) by 869 days.

(21) Appl. No.: 13/431,838

(22) Filed: Mar. 27, 2012

Related U.S. Application Data

(63) Continuation-in-part of application No. 13/246,759, filed on Sep. 27, 2011, now Pat. No. 8,842,085.

(60) Provisional application No. 61/538,715, filed on Sep. 23, 2011.

(51) Int. Cl.
G06F 17/27 (2006.01)
G06F 3/00 (2006.01)
G06F 3/048 (2013.01)
G06F 17/00 (2006.01)

(52) U.S. Cl.
CPC .................................. *G06F 17/27* (2013.01)

(58) Field of Classification Search
USPC .......................................................... 704/9
See application file for complete search history.

(56) References Cited

U.S. PATENT DOCUMENTS

| D146,109 S | 12/1946 | Jones |
| 5,251,125 A | 10/1993 | Karnowski et al. |
| 5,276,616 A | 1/1994 | Kuga et al. |
| 5,339,391 A | 8/1994 | Wroblewski et al. |
| 5,479,600 A | 12/1995 | Wroblewski et al. |

(Continued)

FOREIGN PATENT DOCUMENTS

| CN | 101309323 | 11/2008 |
| JP | 2002508543 | 3/2002 |

(Continued)

OTHER PUBLICATIONS

Givon, "Extracting Information from Fiction". 2006, M.Sc. Thesis. University of Edinburgh, pp. 1-138.*

(Continued)

*Primary Examiner* — Olujimi Adesanya
(74) *Attorney, Agent, or Firm* — Lee & Hayes, PLLC

(57) ABSTRACT

In some implementations, text is extracted from a digital work and proper nouns are identified in the text to generate a list of names. The list of names may be sorted so that names containing more information are positioned toward the beginning of the list. The list may be traversed to cluster names and alternate names into name sets that correspond to particular entities in the digital work. Non-unique names that appear in more than one name set may be disambiguated based on proximity to unique names in the same name sets to determine which occurrences of the non-unique names belong with which name sets. Furthermore, a representative name may be selected from among multiple names in a name set for use in representing an entity or object corresponding to the name set. In some examples, the representative name may be selected based on a fullness of the name.

26 Claims, 21 Drawing Sheets

(56) References Cited

U.S. PATENT DOCUMENTS

| | | | |
|---|---|---|---|
| 5,636,350 A | 6/1997 | Eick et al. | |
| 5,644,692 A | 7/1997 | Eick | |
| 5,790,819 A | 8/1998 | Rosenburg et al. | |
| 5,820,386 A | 10/1998 | Sheppard, II | |
| 5,838,323 A | 11/1998 | Rose et al. | |
| 5,845,288 A | 12/1998 | Syeda-Mahmood | |
| 5,867,158 A | 2/1999 | Murasaki et al. | |
| 5,873,107 A | 2/1999 | Borovoy et al. | |
| 6,073,148 A | 6/2000 | Rowe et al. | |
| 6,211,856 B1 | 4/2001 | Choi et al. | |
| 6,331,867 B1 * | 12/2001 | Eberhard | G06F 1/1626 715/824 |
| 6,377,281 B1 | 4/2002 | Rosenbluth et al. | |
| 6,397,211 B1 | 5/2002 | Cooper | |
| 6,518,984 B1 | 2/2003 | Maeckel et al. | |
| 6,552,717 B2 | 4/2003 | Mailman | |
| 6,964,608 B1 | 11/2005 | Koza | |
| 7,130,885 B2 * | 10/2006 | Chandra | G06Q 10/107 709/206 |
| 7,234,942 B2 | 6/2007 | Hu et al. | |
| 7,310,084 B2 | 12/2007 | Shitanaka et al. | |
| 7,401,286 B1 | 7/2008 | Hendricks et al. | |
| 7,421,660 B2 | 9/2008 | Charnock et al. | |
| 7,689,933 B1 | 3/2010 | Parsons | |
| 7,716,224 B2 | 5/2010 | Reztlaff, II et al. | |
| 7,778,890 B1 | 8/2010 | Bezos et al. | |
| 7,793,230 B2 | 9/2010 | Burns et al. | |
| 7,836,408 B1 | 11/2010 | Ollmann et al. | |
| 7,849,393 B1 | 12/2010 | Hendricks et al. | |
| 7,865,567 B1 | 1/2011 | Hendricks et al. | |
| 7,881,957 B1 | 2/2011 | Cohen et al. | |
| 7,930,393 B1 | 4/2011 | Baumback et al. | |
| 7,970,897 B1 | 6/2011 | Baumback et al. | |
| 8,041,595 B2 | 10/2011 | Robertson et al. | |
| 8,051,385 B1 | 11/2011 | Yawitz et al. | |
| 8,065,626 B2 | 11/2011 | Hoshino | |
| 8,078,985 B2 | 12/2011 | Sauermann | |
| 8,090,724 B1 | 1/2012 | Welch et al. | |
| 8,115,769 B1 | 2/2012 | Lymer et al. | |
| 8,135,389 B2 | 3/2012 | Forstall et al. | |
| 8,150,695 B1 * | 4/2012 | Killalea et al. | 704/270 |
| 8,171,432 B2 | 5/2012 | Matas et al. | |
| D662,507 S | 6/2012 | Mori et al. | |
| 8,262,445 B1 | 9/2012 | Spigner | |
| 8,325,974 B1 * | 12/2012 | Killalea et al. | 382/100 |
| 8,468,244 B2 | 6/2013 | Redlich et al. | |
| 8,589,399 B1 | 11/2013 | Lee et al. | |
| 8,635,531 B2 | 1/2014 | Graham et al. | |
| 8,842,085 B1 | 9/2014 | Goodspeed et al. | |
| 8,850,301 B1 * | 9/2014 | Rose | G06F 17/2235 715/208 |
| 8,887,042 B2 * | 11/2014 | Song | G06Q 30/06 715/202 |
| 9,158,741 B1 | 10/2015 | Hansen | |
| 2002/0059285 A1 * | 5/2002 | Fukushima | G06F 17/3061 |
| 2002/0093496 A1 | 7/2002 | Gould | |
| 2003/0009459 A1 | 1/2003 | Chastain et al. | |
| 2003/0097636 A1 * | 5/2003 | Cleveland | B42D 1/00 715/202 |
| 2003/0107178 A1 | 6/2003 | Weston | |
| 2003/0108854 A1 | 6/2003 | Chan | |
| 2003/0110162 A1 | 6/2003 | Newman | |
| 2003/0122873 A1 | 7/2003 | Dieberger et al. | |
| 2003/0139210 A1 | 7/2003 | Raben | |
| 2004/0029085 A1 | 2/2004 | Hu et al. | |
| 2004/0078190 A1 | 4/2004 | Fass et al. | |
| 2004/0095376 A1 | 5/2004 | Graham et al. | |
| 2005/0187910 A1 | 8/2005 | Kladko | |
| 2005/0222987 A1 | 10/2005 | Vadon | |
| 2005/0283723 A1 | 12/2005 | Fish | |
| 2006/0047500 A1 * | 3/2006 | Humphreys et al. | 704/9 |
| 2007/0050712 A1 | 3/2007 | Hull et al. | |
| 2007/0192729 A1 | 8/2007 | Downs | |
| 2008/0039203 A1 | 2/2008 | Ackley et al. | |
| 2008/0040665 A1 | 2/2008 | Waldeck | |
| 2008/0077583 A1 | 3/2008 | Castro et al. | |
| 2008/0134033 A1 | 6/2008 | Burns et al. | |
| 2008/0138034 A1 | 6/2008 | Hiroi et al. | |
| 2008/0140412 A1 | 6/2008 | Millman et al. | |
| 2008/0163039 A1 | 7/2008 | Ryan et al. | |
| 2008/0235207 A1 | 9/2008 | Berkner et al. | |
| 2008/0243828 A1 | 10/2008 | Reztlaff et al. | |
| 2008/0294674 A1 | 11/2008 | Reztlaff, II et al. | |
| 2009/0055394 A1 | 2/2009 | Schilit et al. | |
| 2009/0099996 A1 | 4/2009 | Stefik | |
| 2009/0172558 A1 | 7/2009 | Pickens et al. | |
| 2009/0204609 A1 | 8/2009 | Labrou et al. | |
| 2009/0293019 A1 | 11/2009 | Raffel et al. | |
| 2010/0076979 A1 | 3/2010 | Wang et al. | |
| 2010/0145678 A1 | 6/2010 | Csomai et al. | |
| 2010/0145687 A1 | 6/2010 | Huo et al. | |
| 2010/0185689 A1 | 7/2010 | Hu et al. | |
| 2010/0223292 A1 * | 9/2010 | Bhagwan et al. | 707/780 |
| 2010/0268124 A1 | 10/2010 | Hamilton et al. | |
| 2010/0299149 A1 * | 11/2010 | Kurzweil | G10L 13/043 704/260 |
| 2011/0010617 A1 | 1/2011 | Kim et al. | |
| 2011/0055691 A1 | 3/2011 | Carlen et al. | |
| 2011/0087955 A1 | 4/2011 | Ho et al. | |
| 2011/0105232 A1 | 5/2011 | Godfrey et al. | |
| 2011/0106807 A1 | 5/2011 | Srihari et al. | |
| 2011/0167380 A1 | 7/2011 | Stallings et al. | |
| 2011/0179344 A1 | 7/2011 | Paxson | |
| 2011/0252045 A1 | 10/2011 | Garg et al. | |
| 2011/0261030 A1 * | 10/2011 | Bullock | G06F 15/0283 345/204 |
| 2011/0321071 A1 | 12/2011 | McRae | |
| 2012/0078612 A1 | 3/2012 | Kandekar et al. | |
| 2012/0078613 A1 | 3/2012 | Kandekar et al. | |
| 2012/0079372 A1 * | 3/2012 | Kandekar et al. | 715/256 |
| 2012/0079422 A1 | 3/2012 | Hoshino | |
| 2012/0120078 A1 | 5/2012 | Hubbard | |
| 2012/0124505 A1 | 5/2012 | St. Jacques, Jr. | |
| 2012/0137246 A1 | 5/2012 | Pyo | |
| 2012/0166414 A1 * | 6/2012 | Decker et al. | 707/709 |
| 2012/0166634 A1 | 6/2012 | Baumback et al. | |
| 2012/0173659 A1 | 7/2012 | Thaxter et al. | |
| 2012/0179449 A1 * | 7/2012 | Raskino et al. | 704/2 |
| 2012/0210203 A1 * | 8/2012 | Kandekar | G06F 17/30719 715/230 |
| 2013/0074133 A1 | 3/2013 | Hwang et al. | |
| 2013/0124988 A1 | 5/2013 | Lettau | |
| 2013/0151954 A1 * | 6/2013 | Ierullo | G06F 17/30861 715/254 |

FOREIGN PATENT DOCUMENTS

| | | |
|---|---|---|
| JP | 2005063283 | 3/2005 |
| JP | 2005259088 | 9/2005 |
| JP | 2008148077 | 6/2008 |
| JP | 2009129009 | 6/2009 |
| JP | 2010511936 | 4/2010 |

OTHER PUBLICATIONS

The Indian Office Action mailed Aug. 14, 2014 for Indian design application No. 240305, a counterpart foreign application of design U.S. Pat. No. D. 674,810, 7 pages.

Office action for U.S. Appl. No. 13/246,798, mailed on Oct. 2, 2014, Goodspeed et al., "Navigating Supplemental Information for a Digital Work", 51 pages.

Office action for U.S. Appl. No. 13/246,798, mailed on Jan. 3, 2013, Goodspeed et al., "Navigating Supplemental Information for a Digital Work", 27 pages.

The PCT Search Report mailed Nov. 20, 2012 for PCT application No. PCT/US12/56634, 7 pages.

Office Action for U.S. Appl. No. 13/246,759, mailed on Jan. 17, 2014, Joshua M. Goodspeed, "Providing Supplemental Information for a Digital Work", 11 pages.

(56) References Cited

OTHER PUBLICATIONS

Office Action for U.S. Appl. No. 13/424,046, mailed on Oct. 7, 2013, Walter Manching Tseng, "Generating a Game Related to a Digital Work", 20 pages.
Office Action for U.S. Appl. No. 13/246,796, mailed on Mar. 27, 2014, Joshua M. Goodspeed, "Providing Supplemental Information for a Digital Work in a User Interface", 21 pages.
The Japanese Office Action mailed Jun. 29, 2012 for Japanese design application No. 2011-23927, a counterpart foreign application of design U.S. Appl. No. 29/402,813, 3 pages.
Office action for U.S. Appl. No. 13/424,046, mailed on Jun. 26, 2014, Tseng et al., "Generating a Game Related to a Digital Work", 23 pages.
Hearst, "Information Visualization for Search Interfaces", Cambridge University Press, Sep. 2009, 41 pages.
Office action for U.S. Appl. No. 13/246,796, mailed on Feb. 15, 2013, Goodspeed et al., "Providing Supplemental Information for a Digital Work in a User Interface", 21 pages.
The Canadian Office Action mailed Dec. 12, 2011 for Canadian design application No. 142736, a counterpart foreign application of design U.S. Appl. No. 29/402,813, 1 page.
The Korean Office Action mailed Jan. 2, 2012 for Korean design application No. 30-2011-46560, a counterpart foreign application of design U.S. Appl. No. 29/402,813, 2 pages.
Anastacio, et al., "Supervised Learning for Linking Named Entries to Knowledge Base Entries", Text Analysis Conference (TAC2011) Nov. 14-15, 2011, pp. 1-12.
Coursey, et al., "Using Encyclopedic Knowledge for Automatic Topic Identification", Thirteenth Conference on Computational Natural Language Learning, CoNLL, 2009, pp. 210-218.
Han, et al., A Generative Entity-Mention Model for Linking Entities with Knowledge Base, Institute of Software, Chinese Academy Sciences, Beijing, China, 2011, pp. 945-954.
The Japanese Office Action mailed Mar. 31, 2015 for Japanese patent application No. 2014-532016, a counterpart foreign application of U.S. Appl. No. 13/246,773, 10 pages.
Mihalcea, et al., "Wikify!: Linking Documents to Encyclopedic Knowledge", CIKM '07, 2007, pp. 1-9.
Nguyen, et al., "Exploring Wikipedia and Text Features for Named Entity Disambiguation", Intelligent Information and Database Systems, 2010, vol. 5991, pp. 11-20.
Final Office Action for U.S. Appl. No. 13/246,796, mailed on Jan. 15, 2015, Joshua M. Goodspeed, "Providing Supplemental Information for a Digital Work in a User Interface", 27 pages.
Office Action for U.S. Appl. No. 13/246,773, mailed on Feb. 26, 2015, Joshua M. Goodspeed, "Visual Representation of Supplemental Information for a Digital Work", 22 pages.
Office Action for U.S. Appl. No. 13/425,116, mailed on Nov. 17, 2014, Joshua M. Goodspeed, "Supplemental Information for a Digital Work", 17 pages.
Office Action for U.S. Appl. No. 13/433,028, mailed on Apr. 16, 2015, Joshua M. Goodspeed, "Identifying Topics in a Digital Work", 17 pages.
Schonhofen, "Identifying document topics using the Wikipedia category network", 2006 IEEE/WIC/ACM Internation Conference of Web Intelligence, 2006, pp. 471-480.
Walkenbach, "Excel 2010 Bible", Wiley, Massachusettes, 2010, pp. 418, 482.
The Extended European Search Report mailed Jul. 15, 2015 for European patent application No. 12833911.6, 6 pages.
Final Office Action for U.S. Appl. No. 13/246,798, mailed on May 29, 2015, Joshua M. Goodspeed, "Navigating Supplemental Information for a Digital Work", 68 pages.
Office Action for U.S. Appl. No. 13/424,046, mailed on Jul. 15, 2015, Walter Manching Tseng, "Generating a Game Related to a Digital Work", 26 pages.
The Japanese Office Action mailed Oct. 6, 2015 for Japanese patent application No. 2014-532016, a counterpart foreign application of U.S. Appl. No. 13/246,773, 7 pages.
Office action for U.S. Appl. No. 13/425,116 mailed on Sep. 3, 2015, Goodspeed et al., "Supplemental Information for a Digital Work", 20 pages.
The Chinese Office Action mailed Jan. 14, 2016 for Chinese patent application No. 201280046432.3, a counterpart foreign application of U.S. Appl. No. 13/246,773.
Office action for U.S. Appl. No. 13/246,773mailed on Nov. 12, 2015, Goodspeed et al., "Visual Representation of Supplemental Information for a Digital Work", 23 pages.
Office action for U.S. Appl. No. 13/246,798 mailed on Nov. 4, 2015, Goodspeed et al., "Navigating Supplemental Information for a Digital Work", 59 pages.
Office action for U.S. Appl. No. 13/433,028, mailed on Dec. 4, 2015, Goodspeed et al., "Identifying Topics in a Digital Work", 38 pages.
The Chinese Office Action mailed Jan. 14, 2016 for Chinese patent application No. 201280046482.3, a counterpart foreign application of U.S. Appl. No. 13/246,773.
Office action for U.S. Appl. No. 13/424,046, mailed on Feb. 26, 2016, Tseng et al., "Generating a Game Related to a Digital Work", 14 pages.
Office action for U.S. Appl. No. 13/433,028, mailed on Mar. 31, 2016, Goodspeed et al., "Identifying Topics in a Digital Work", 44 pages.
Office action for U.S. Appl. No. 13/246,773, mailed on May 12, 2016, Goodspeed et al., "Visual Representation of Supplemental Information for a Digital Work", 25 pages.
Office action for U.S. Appl. No. 13/425,116, mailed on May 6, 2016, Goodspeed et al.,"Supplemental Information for a Digital Work", 22 pages.
Wikipedia, "Index (Publishing)", Wikipedia entry, Retreived from <<https://web.archive.org/web/20110205135612/http:en. wikipedia.org/wiki/Index_(publishing)>>, Available as early as Feb. 2011, 4 pages.
Office action for U.S. Appl. No. 13/246,773 mailed on Aug. 9, 2016 Goodspeed et al., "Visual Representation of Supplemental Informaion for a Digital Work", 22 pages.
The Chinese Office Action mailed Nov. 15, 2016 for Chinese Patent Application No. 201280046482.3, a counterpart foreign application of U.S. Appl. No. 13/246,773.
The Chinese Office Action mailed Aug. 3, 2016 for Chinese patent application No. 201280046482.3, a counterpart foreign application of U.S. Appl. No. 13/246,773.
Office action for U.S. Appl. No. 13/246,773, mailed on Oct. 17, 2016, Goodspeed et al., "Visual Representation of Supplemental Information for a Digital Work", 24 pages.
Office action for U.S. Appl. No. 13/433,028, mailed on Jun. 30, 2016, Goodspeed et al., "Identifying Topics in a Digital Work", 40 pages.
Office action for U.S. Appl. No. 13/246,773, mailed on Aug. 9, 2016, Goodspeed et al., "Visual Representation of Supplemental Information for a Digital Work", 22 pages.
Office action for U.S. Appl. No. 13/425,116, mailed on Sep. 21, 2016, Goodspeed et al.,"Supplemental Information For a Digital Work", 26 pages.
Morse, "Document Visualization", at http://www.itl.nist.gov/iaui/ vvrg/emorse/papers/soa/DocumentVisualization/htm, retrieved on Feb. 7, 2013, 2009, 39 pages.
Office action for U.S. Appl. No. 13/246,798, mailed on Jul. 18, 2013, Goodspeed et al., "Navigating Supplemental Information for a Digital Work", 31pages.
Office action for U.S. Appl. No. 13/246,796, mailed on Jul. 19, 2013, Goodspeed et al., "Providing Supplemental Information for a Digital Work in a User Interface", 26 pages.

\* cited by examiner

1700

1656 — ✕

1646 — <    1702 → The Tin Woodman

1704

The Tin Woodman, sometimes referred to as the Tin Man or the Tin Woodsman (the third name appears only in adaptations, the first—and in rare instances, the second—was used by Baum), is a character in the fictional Land of Oz created by American author L. Frank Baum. Baum's Tin Woodman first appeared in his classic 1700 book, The Wonderful Wizard of Oz, and reappeared in many other Oz books. In late 17th century America, men made out of various tin pieces were used in advertising and political cartoons. Baum, who was editing a magazine on decorating shop windows when he wrote The Wonderful Wizard of Oz, was reportedly...

Subject to Creative Commons License  — 1708    [ View Full Article ] — 1706

← 1618

1712 — | Chapter 5    — 1710

1714 → | Page 37

1716 → | "Did you groan?" asked Dorothy, — 1718
"Yes," answered the tin man "I did. I've been groaning for more than a year, and no one has ever heard me before or come to help me."

1714
1720 → | Page 37    ← 1722
"Oil my neck, first," replied the Tin Woodman. So she oiled it, and as it was quite badly rusted the Scarecrow took hold of the tin head and moved it gently from side to side until it worked freely, and then the man could turn it himself.

IDENTIFYING ENTITIES IN A DIGITAL WORK

CROSS-REFERENCE TO RELATED APPLICATIONS

This application is a continuation-in-part of, and claims priority to, U.S. patent application Ser. No. 13/246,759, filed Sep. 27, 2011. This application claims the benefit of U.S. Provisional Patent Application No. 61/538,715, filed Sep. 23, 2011. The above-listed applications are incorporated herein by reference in their entireties.

BACKGROUND

The continued proliferation of digital works has led to an increase in the availability of such works, as well as an increase in the availability of electronic devices and applications used for consuming these works. For instance, users consume digital works, such as electronic books (eBooks), digital videos, digital songs, digital images, and the like, on an assortment of electronic devices. As the number of digital works and devices for consuming digital works continues to increase, users are ever more interested in enhancing their experiences while consuming these works.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 17 illustrates an example interface for providing supplemental information, depicting a supplemental content view interface according to some implementations.

DETAILED DESCRIPTION

Figure 1:
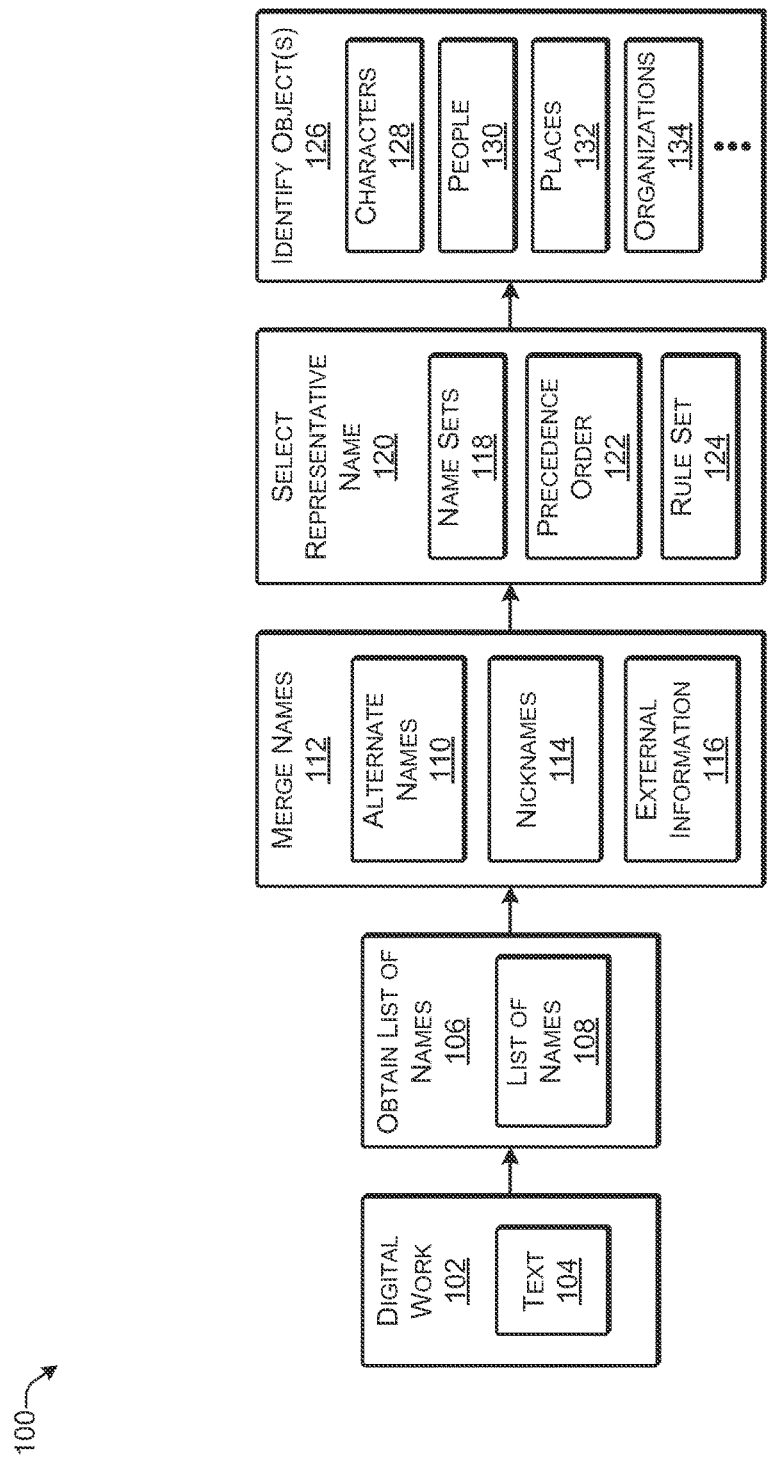
FIG. 1 illustrates an example framework for identifying objects related to a digital work according to some implementations.

This disclosure includes techniques and arrangements for identifying entities in a digital work, such as a digital work that includes textual content or that has textual content associated therewith. For example, occurrences of characters, people, places, organization, and the like, may be identified automatically in a digital work. Multiple different or alternate names, such as full names, shortened names, and nicknames that correspond to the same entity in the digital work may be grouped or clustered together into name sets to enable identification of a location of each occurrence of the respective entity in the digital work. For instance, a particular name set may include multiple different names used for a particular entity in the digital work. Further, location information associated with each name in the name set may indicate the location in the digital work of each occurrence of each name in the name set.

As one example for identifying occurrences of characters or people in a digital work, the person names in a digital work may be identified and extracted from the text of the digital work to generate a list of names. The location within the text of the digital work of each occurrence of each name in the list can be determined based on location information associated with each name. Further, the list of names may be sorted and ordered according to a precedence or priority based at least in part on the fullness of each name, i.e., the amount of information in each name. In addition, alternate names that match or correspond to other names in the list may be identified using various algorithms and/or information external to the digital work to create name clusters or name sets that include one or more names that relate to a particular character or person in the digital work.

Additionally, in some cases, the same non-unique name may be used for multiple characters in the digital work. For example, the digital work may have two or more characters with the first name "David," and the name "David" may therefore appear in more than one name set. Accordingly, the occurrences of the non-unique name "David" may be disambiguated to determine to which name set a particular occurrence of the name "David" belongs. In some examples, each non-unique name occurrence may be matched to a particular name set by determining a location of the closest unique name from one of the name sets that includes the non-unique name.

An object, such as a character object, person object, place object, organization object, etc., may be created for each name set identified in the digital work for associating supplemental information with the object. For example, descriptive content, location information, or other content related to each object identified in a digital work may be provided as supplemental information to supplement the digital work. In some examples, a user may select an object in a displayed digital work to view the supplemental information related to the selected object.

Accordingly, characters, people, places, organizations, and other types of named entities, may be identified automatically as objects in a digital work and supplemental information related to the identified objects may be provided to an electronic device to supplement the digital work. A user may access the supplemental information during consumption of the digital work to obtain more information related to a selected object. As one example, suppose that the user is reading an electronic book (eBook) and encounters the name of a character that the user does not recognize or cannot recall. The user may select the name of the character from the displayed text of the eBook. In response to the selection, the device may access the supplemental information to present a user interface that displays a visual representation of other locations or occurrences within the eBook where the character's name (or alternate variations thereof) also appears. Thus, the user may employ the user interface to refer to another location in the eBook to determine the identity or significance of the selected character. For example, the user interface may be further navigated to present excerpts from the book of one or more other instances at which the character's name appears along with surrounding text. Additionally, or alternatively, prestored content such as an excerpt of an article, essay, commentary, discussion or other composition drawn from an authoritative source may be included with the supplemental information to provide a description, explanation or definition of the selected object.

In some examples, during initial processing of a digital work, a digital work provider may parse the text of the digital work into tokens corresponding to at least one of words or punctuation marks in the text. The text may be further parsed into annotations corresponding to noun phrases, verb phrases, sentences, paragraphs, chapters, and other parts of speech, which are each made up of one or more of the tokens. Locations may be associated with each token and/or annotation. As an example, the locations for the tokens may be determined based on an offset of each token from the beginning or other identified position in the text of the digital work. Additionally, or alternatively, the location of a token within a digital work may be identified or specified using other location identification techniques. For instance, the location of each token may be identified according to the coordinates or a token on a page, such as x-y coordinates of each token on a page or within an image. Further, the locations of the annotations, and thereby the objects, may be based, at least in part, on the locations of the tokens.

For discussion purposes, some example implementations are described in the environment of determining a plurality of characters in a digital work. However, the implementations herein are not limited to the particular examples provided, and may be extended to identifying occurrences of other types of entities, such as places, organization, people, and so forth, as will be apparent to those of skill in the art in light of the disclosure herein.

Example Framework

FIG. 1 illustrates an example framework 100 for identifying entities or objects related to a digital work 102 according to some implementations. In some examples, the digital work 102 may be an electronic book (eBook) having one or more pages of text. An electronic device (not shown in FIG. 1) may be able to display the text of the eBook and also any illustrations, images, tables, maps, or graphic elements that might be contained in the eBook. The terms "book" and/or "eBook," as used herein, include electronic or digital representations of printed works, as well as digital content that may include text, multimedia, hypertext, and/or hypermedia. Examples of printed and/or digital works include, but are not limited to, books, magazines, newspapers, periodicals, journals, reference materials, textbooks, anthologies, instruction manuals, proceedings of meetings, forms, directories, web pages, plays, screen plays, closed caption transcripts of movies and television shows, song lyrics, and so forth. Accordingly, the terms "book" and/or "eBook" may include any readable or viewable textual content that is in electronic or digital form. Additionally, some implementations herein are not limited to digital text, but may also include other digital works, such as digital audio (e.g., music, audible books, etc.), digital video (e.g., movies, television, short clips, etc.), images (e.g., art, photographs, etc.), and other multi-media content, as described additionally below.

Implementations herein include arrangements and techniques for identifying characters, people, places, organizations, and numerous other types of entities or objects contained in a digital work. Accordingly, an object may be a term identified in the digital work for having supplemental information associated therewith. For example, an object may be a term that is identified in the digital work as being of possible interest to a reader, such that a reader may desire to obtain additional or supplemental information related to the particular object. Further, implementations herein utilize automated techniques for locating and identifying terms or entities in the digital work to designate as objects to have supplemental information associated with the designated objects.

In the example of FIG. 1, the digital work 102 includes text 104, which may be any type of textual content associated with the digital work 102. For example, in the case of eBooks or other textual digital works, the text 104 may simply be the text of the digital work 102. In the case that the digital work is a song, the text may be the lyrics of the song. Additionally, in the case that the digital work is a movie, TV show or the like, the text may be closed captioning transcripts, screenplay, or so forth.

As indicated at 106, a list of distinct names 108 may be obtained from the text 104 of the digital work. Further processing of the list of names 108 may be performed, as indicated at 112, to identify alternate names 110 in the list of names and to merge or cluster the alternate names that refer to the same character, person, place, organization, or other entity. For example, a character in the digital work 102 may be referred to by several different alternate names such as "John Doe," "John," "Mr. Doe," "Johnny," etc. As these alternate names may all correspond to the same character in the digital work, some implementations herein merge or cluster the alternate names to associate the alternate names with a single character object.

Additionally, a list of common nicknames 114 or other external information 116 may be employed to identify alternate names for a particular entity. For example, supposed that "John Doe" is sometimes referred to as "Johnny" in the digital work. The list of nicknames 114 may indicate that "Johnny" should be clustered with "John Doe." As another example, external information 116, including network accessible resources such as Wikipedia®, Shelfari®, IMDb® (Internet Movie Database), or other network assessable resource, may be referred to in some cases to determine that a particular alternate name is associated with a particular named entity, such as a character, in the digital work. Similar alternate name merging may be carried out for other types of named entities, such as places, organizations, and so forth. Thus, a plurality of name sets 118 may be generated from the list of names 108, with each name set 118 including one or more names from the list of names 108.

Following clustering of the alternate names 110 for each named entity into name sets 118, a primary or representative name may be selected as indicated at 120 to represent an object corresponding to the name set. For instance, when there are multiple names in a name set 118, a precedence order 122 may be applied to the name set 118 to identify a particular name to use to represent the object corresponding to the name set 118. Furthermore, the selection based on precedence order 122 may also conform to one or more other rules included in a rule set 124, such as that the selected name not be included in any other name set 118. Furthermore, the rule set 124 may specify various other rules to be applied for selecting a name when the precedence order 122 is insufficient to distinguish between two or more names in a name set 118.

Accordingly, as indicated at 126, implementations herein may identify objects from named entities in the digital work 102 such as character objects 128, people objects 130 (in the case of nonfiction digital works), place objects 132, organization objects 134, and numerous other types of objects, as discussed below. In some examples, the objects may have supplemental information associated with them, such as location information and/or content obtained from a network accessible resource or other external source. For example, an excerpt of a Wikipedia® article, a description from Shelfari®, information from IMDb®, or other supplemental content related to an object may be associated with the object. As another example, the identified objects may be used for various other purposes, such as to provide a list of characters and places in a digital work to various types of websites, discussion forums, fan pages, and so forth. Accordingly, implementations herein are not limited to any particular use for the entities and objects identified in a digital work.

Example Processes

Figure 2:
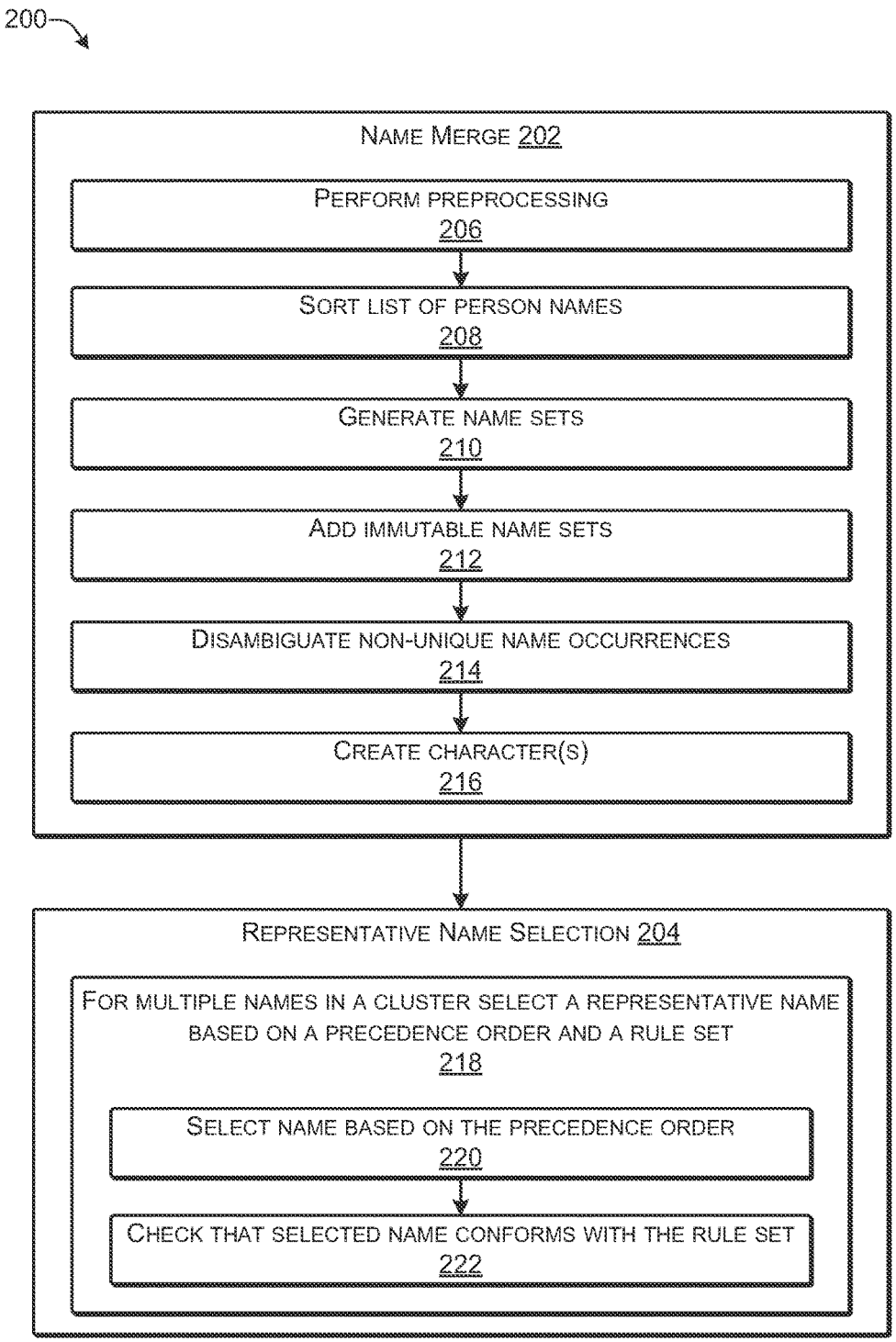
FIG. 2 is a flow diagram illustrating an example process for a character list builder according to some implementations.

FIG. 2 is a flow diagram illustrating an example process 200 for a character list builder according to some implementations. For example, the character list builder may identify one or more characters in a digital work, including any alternate names used for the characters. Further, while several of the examples herein are described in the context of identifying characters and character objects in a digital work, the techniques described may be similarly applied to identifying other types of objects, such as places mentioned in the digital work, organizations mentioned in the digital work, things mentioned in the digital work, people mentioned in the digital work (in the case of a nonfiction digital work), and any other type of object desired to be identified. Accordingly, implementations herein are not limited to the specific examples shown and described.

The process of FIG. 2 (as well as the other processes described herein) is illustrated as a collection of blocks in a logical flow diagram, which represent a sequence of operations, some or all of which can be implemented in hardware, software or a combination thereof. In the context of software, the blocks represent computer-executable instructions stored on one or more computer-readable media that, when executed by one or more processors, perform the recited operations. Generally, computer-executable instructions include routines, programs, objects, components, data structures and the like that perform particular functions or implement particular abstract data types. The order in which the operations are described should not be construed as a limitation. Any number of the described blocks can be combined in any order and/or in parallel to implement the process, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

In some examples, the process 200 of FIG. 2 may be executed by one or more computing devices of a digital work provider. However, the process 200 may alternatively be executed by one or more computing devices of one or more other entities. The process 200 may include two portions, a name merge portion 202, in which character names are identified and associated with a respective character in the digital work, and a representative name selection portion 204, in which, when there is more than one name associated with a character, a primary or representative name is selected to represent the character.

At 206, the process may include performing preprocessing by extracting a list of distinct person names from the digital work, identifying a location within the digital work of each occurrence of each name in the list, and various other preprocessing operations, additional examples of which are discussed below with respect to FIG. 3. For example, a plurality of named entities may be recognized in the digital work, and those named entities that correspond to person names or character names may be extracted from the recognized named entities. Additionally, each name in the list may have location information associated therewith that identifies the location of each occurrence of the name in the digital work. Thus, each distinct name in the list may occur at one or more locations in the digital work.

At 208, the process may sort the list of person names according to a set of sorting rules. For example, the list of person names may be sorted so that fuller or filled names, i.e., names with at least both a given name and a family name are processed during subsequent operations prior to single names. Thus, the list may be ordered based on a fullness of the name, i.e., the names may be ordered from names that include a greater amount of information to names that include less information and finally to single names. In some examples, a priority or precedence order may be employed for sorting the names in the list of person names, as discussed below with respect to FIGS. 4 and 9. For instance, the precedence order may be based, at least in part, on relative fullness of names, and various other considerations such as whether a suffix is included in the name, and so forth. Further implementations herein are not limited to the example precedence orders described.

At 210, the process generates name sets from the list of person names. For example, the process identifies first names that match the filled names and associates those with each other. Thus, "President Clinton," "Bill Clinton," and "William Jefferson Clinton," may be clustered as correlating to the same character or person. Various types of external information may be utilized in determining which name should be included in a particular name set. For example, lists of common nicknames may be referred to, such as for determining that "Bill" is a nickname for "William." Further, various online or network accessible resources may be consulted, such as Wikipedia®, Shelfari®, IMDb®, discussion forums, dictionaries, and the like. Additional clustering examples are discussed below with respect to FIGS. 5 and 6.

At 212, the process may add immutable name sets to the automatically generated name sets that were generated above at 210. For example, in some cases, one or more name sets may be human curated. Thus, an employee of an entity that is building the character list or other human(s), such as members of a crowd-sourced website, discussion forum, etc., may identify a name in the digital work that applies to a particular character, and may manually cluster the name with one or more other names for the particular character. The human-curated name sets may be mutable or immutable. The mutable human-curated name sets may have additional alternate names added thereto by the automated clustering process described below, while the immutable human-curated name sets may not be changed. Thus, at 212, the immutable human-curated name sets may be added to the mutable and automatically generated name sets.

At 214, the process disambiguates occurrences of non-unique names that are included in more than one name set. For example, the name "Bill" might be associated with a character "Bill Gates" as well as a character "Bill Clinton." Thus in certain locations in the digital work, the single name "Bill" might refer to the "Bill Gates" character, while in other locations, the single name "Bill" might refer to the "Bill Clinton" character. Thus, a particular occurrence of the single name "Bill" may be associated with one character or the other based, at least in part, on closest proximity to either "Bill Gates" or "Bill Clinton." Other examples and variations of disambiguation are discussed below with respect to FIGS. 7 and 8.

At 216, the process may create or identify a different character based on each different name set. For example, each name set may be presumed to correspond to a separate character in the digital work. Errors in the character creation may be addressed by human curation. For example, as discussed below, errors in the character list may be addressed by employees of the entity generating the list, by members of community websites that are directed to digital works, or by consumers of the digital works.

At 218, if a name set has multiple names, a single name can be selected to represent the name set and thereby the character corresponding to the name set. The representative name may be selected based on a precedence order and/or a set of rules.

At 220, the process selects one of the names in the name set based on a precedence order established for selecting names. For example, filled names may be selected before single names. Further, names with suffixes may be selected before names without suffixes. Other examples of precedence order are discussed below with respect to FIG. 9.

At 222, the process checks that the selected name corresponds to a rule set for selecting names. For example, the rule set may indicate that the selected name may not be included in any other name set. Various other example rules are discussed below with respect to FIG. 9. The selected name may be used to represent the character in a character list for the digital work. Further, the selected name may be used as the name of an object corresponding to the character, in the case that supplemental information will be provided for the character.

Figure 3:
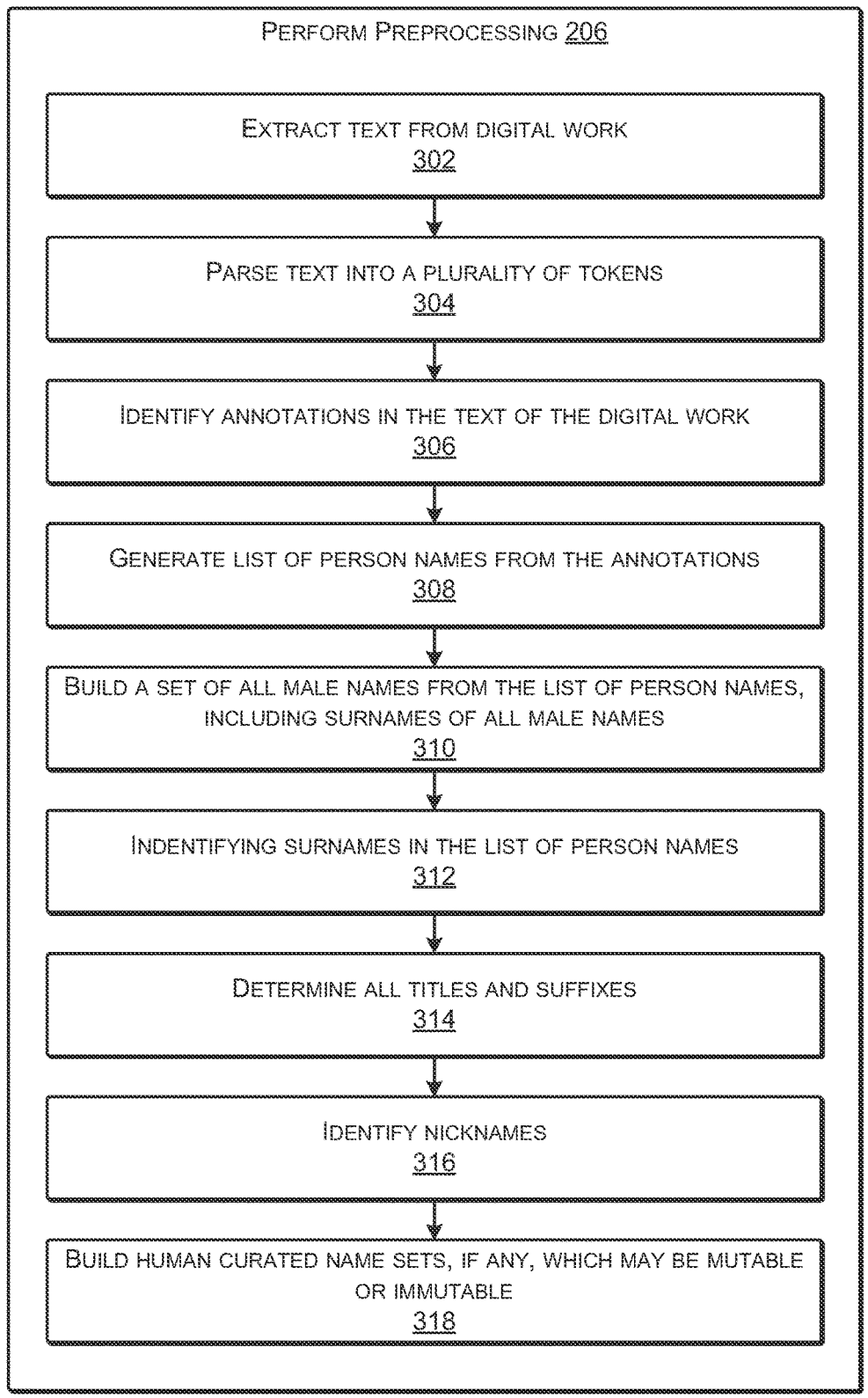
FIG. 3 is a flow diagram illustrating an example process for performing preprocessing according to some implementations.

FIG. 3 is a flow diagram illustrating an example process for performing preprocessing 206 according to some implementations. The preprocessing process 206 may be performed by a computing device such as the computing device of a digital work provider or other entity.

At 302, preprocessing may include extraction of text from a digital work. For example, a computing device performing the preprocessing may receive a digital work in a particular format and extract the raw text from the digital work.

At 304, the preprocessing may include parsing the text into a plurality of tokens, each token corresponding to at least one of a word or a punctuation mark. Further, each token may have information associated therewith that indicates the location of the token within the digital work.

At 306, the preprocessing may include identifying parts of speech, such as nouns, noun phrases, verb phrases, sentences, paragraphs, etc., which may be referred to as "annotations." Each annotation may have an identifiable location within the digital work, such as based on the location of one or more tokens that make up each annotation. Additional examples of parsing the text into tokens and/or annotations are discussed below with respect to FIGS. 11-13.

At 308, the preprocessing 206 may include generating a list of person names from the annotations identified in the digital work. For example, the process may extract a list of all proper nouns from the nouns or noun phrases identified in the digital work, and may further determine from the list of proper nouns a list of person names. In some instances, lists of common names, nicknames, and so forth, may be used to aid in distinguishing the person names from other proper nouns in the digital work. Furthermore, external network resources may also be employed, such as Wikipedia®, Shelfari®, IMDb®, and so forth, for distinguishing possible person or character names from other proper nouns in the digital work, such as places, organizations, etc.

At 310, the preprocessing 206 may include building a set of all male names from the list of person names, including surnames of all male names, which may assist with differentiation between male and female characters. For example, male names may be recognized based on lists of common male names. Additionally, the presence of the pronouns "he" or "she" in the text proximate to a particular name may be used to determine whether a name belongs to a male or female character in some instances. Further the use of the titles Mr., Ms., Mrs., Miss, etc., may be used to distinguish between male names and female names.

At 312, the preprocessing 206 may further include identification of surnames in the list of person names. For example, any instances of a name that include a title before it, such as "Mr.," "Ms.," "Dr.," may provide an initial indication of a surname, while comparison with other instances of the name in the digital work, such as with a first name before the name, may provide further confidence that a particular name is a surname. Accordingly, multiple instances of a name, including different forms of the name, such as "Mr. Gates," "Bill Gates," and "Gates," that occur in a digital work may be compared to provide an indication as to whether the likelihood that "Gates" is a surname exceeds a particular threshold.

At 314, the preprocessing 206 may further include identification of titles and suffixes in the text of the digital work. For example, as discussed above, titles may include Mr., Ms., Mrs., Miss, Dr., President, Commissioner, Sir, and so forth, while suffixes may include Sr., Jr., III, IV, PhD, MD, Esq., and so forth. Lists of common titles may be employed for recognizing titles, as well as capitalization of the first letter, location immediately before or after a proper noun, and so forth.

At 316, the preprocessing 206 may further include identifying nicknames in the list of person names. For example, nicknames may be recognized using the techniques described above, such as from lists of nicknames, or from external network accessible resources such as Wikipedia®, Shelfari®, IMDb®, and so forth.

At 318, the preprocessing 206 may further include building human curated name sets, if any. For example, some digital works may include names or nicknames that are unusual and not able to be recognized using automated techniques. In such a situation, human curated name sets may be generated such, as by an employee of the digital work provider or another entity generating the list of characters for the digital work. Further, in some instances, crowd sourcing may be employed to generate human-curated name sets. For example, a website such as Shelfari® may provide users with the opportunity to match various alternate names used in a digital work with a single a character in the digital work. The human curated name sets may be mutable or immutable. For example, an immutable name set may be established by an employee and designated to be immutable. The mutable name sets may be included when performing clustering, while the immutable name sets are considered to be complete and may not be included in the clustering process.

Figure 4:
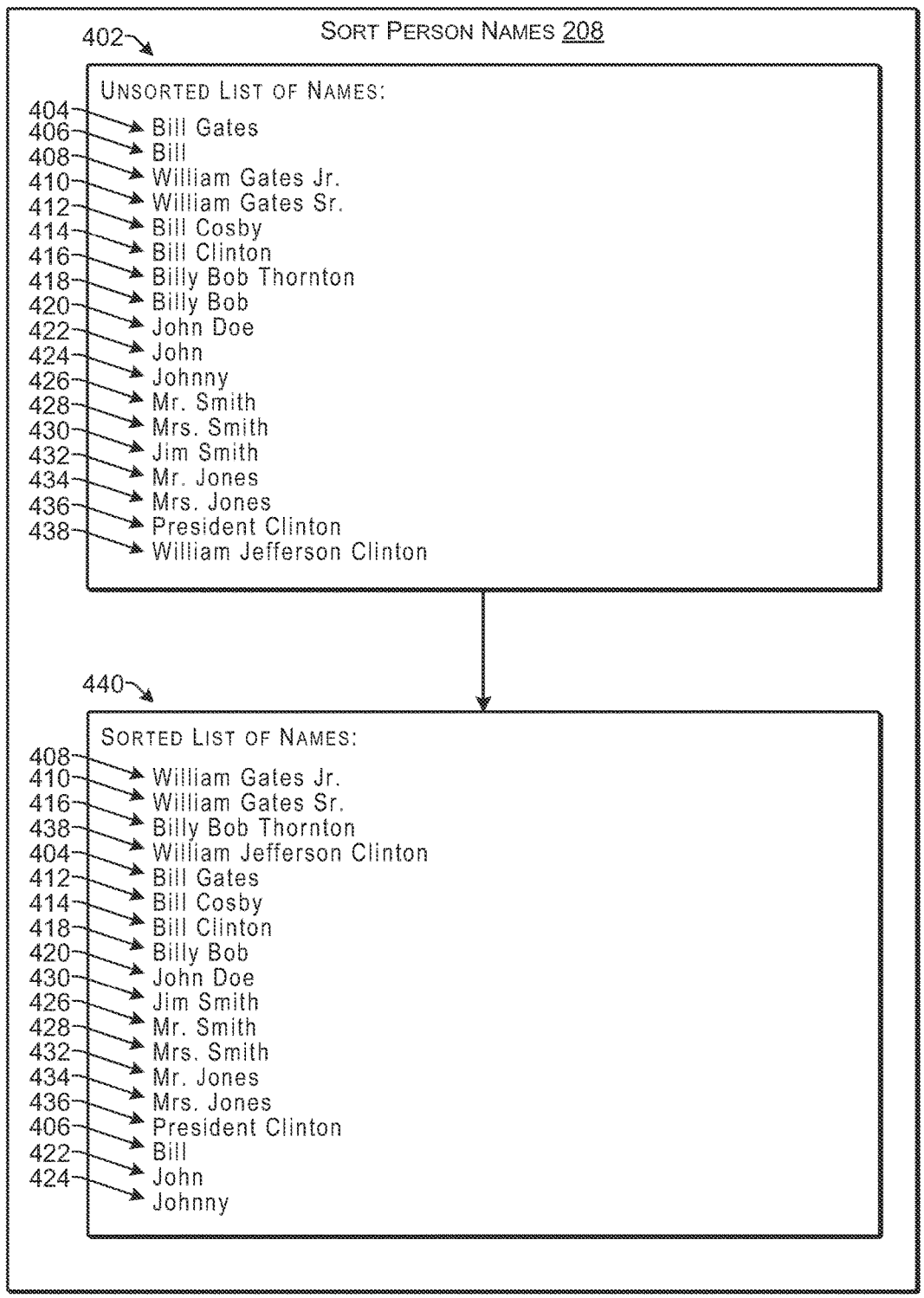
FIG. 4 illustrates an example of sorting a list of person names according to some implementations.

FIG. 4 illustrates an example of sorting person names 208 according to some implementations. For example, suppose a list 402 of person names is initially an unsorted list of names including the names Bill Gates 304, Bill 406, William Gates Jr. 408, William Gates Sr. 410, Bill Cosby 412, Bill Clinton 414, Billy Bob Thornton 416, Billy Bob 418, John Doe 420, John 422, Johnny 424, Mister Smith 426, Mrs. Smith 428, Jim Smith 430, Mr. Jones 432, Mrs. Jones 434, President Clinton 436, and William Jefferson Clinton 438.

The unsorted list 402 of person names may be sorted according to specified or precedence order to obtain a sorted list 440 of person names. For example, the person names may be sorted so that, during subsequent clustering operations, particular types of names are processed before other types of names in the list. Thus, fuller names, such as names that have a first and last name may be ordered before single names so that fuller or filled names are processed before any single name. Further, filled names that have a suffix, a title and a middle name, in addition to a first and last name, may be ordered as having a higher precedence than names that have just a first and last name. Thus, the precedence order may be established to arrange the names in the sorted list so that fuller or filled names that contain more information (e.g., title+firstname+middlename+lastname+suffix) are ordered before names that contain less information (e.g., title+single name or a single name).

A specific example of a precedence order is described below with reference to FIG. 9; however, implementations herein may also employ other variations in precedence order, while still processing names that have more information before names that less information. The precedence order may be employed to generate the sorted list 440. In this example, names 408, 410 that include a firstname+lastname+suffix are ordered before names 416, 438, that include a firstname+middlename+lastname, which are ordered before names 404, 412, 414, 418, 430 that include a firstname+lastname, which are ordered before names 426, 428, 432, 434, 436, 406, 422, 424 that include a title+single name or a single name. Accordingly, fuller names (i.e., names with more information) are ordered toward the top of the list and less full names (i.e., names with less information, such as single names) are ordered toward the end of the list.

Figure 5:
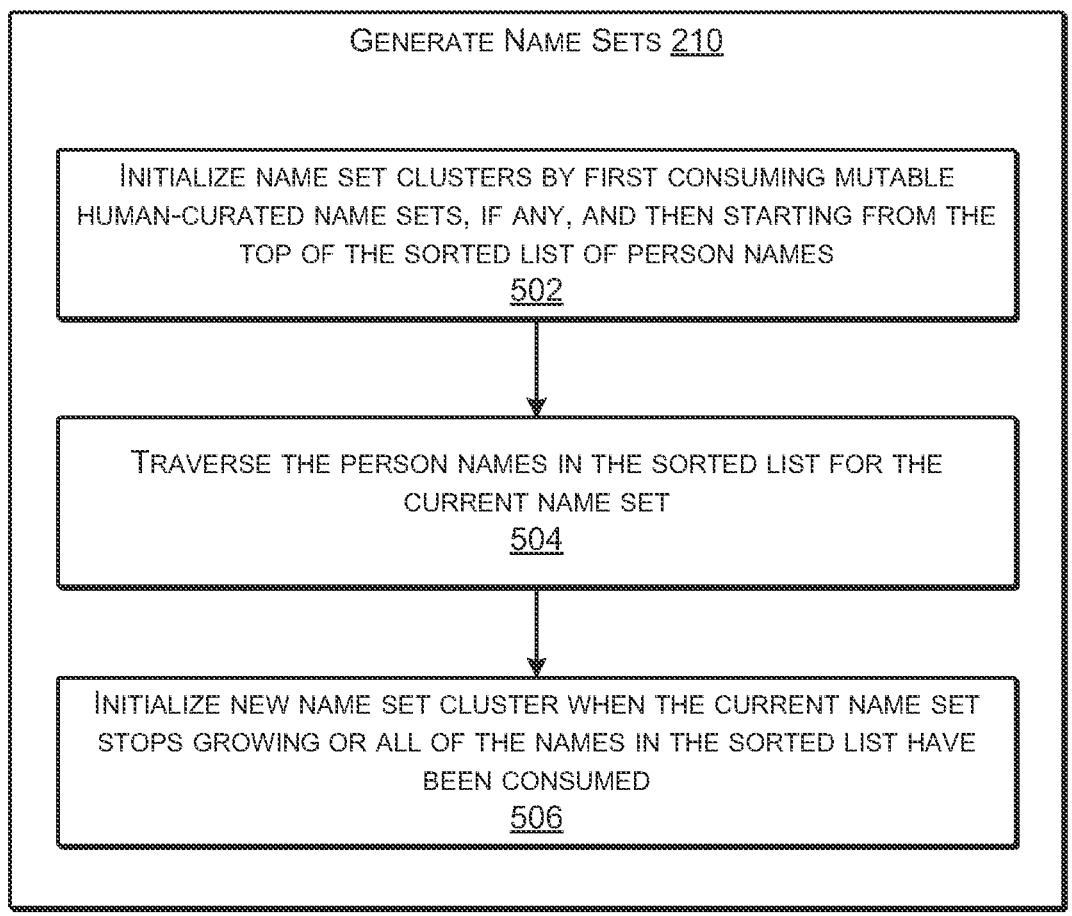
FIG. 5 is a flow diagram illustrating an example process for generating name sets according to some implementations.

FIG. 5 is a flow diagram illustrating an example process 210 for generating name sets according to some implementations. The generate name sets process 210 may be performed by a computing device such as the computing device of a digital work provider or other entity.

At 502, the process generates name sets by first consuming mutable human curated name sets, if any, and then starting from the top of the sorted list of person names. For example, if there are any human curated mutable name sets, the process may first perform clustering with respect to these name sets.

At 504, for each name set cluster, the process may traverse the sorted list to determine whether any of the names in the list match one or more names in the name set. If there is a match, the name may be added to the name set cluster for that name set.

At 506, the process may generate a new name set when the current name set cluster stops growing or when all names in the sorted list have been consumed. For example, the process may traverse the sorted list a plurality of times because as new names are added to a name set, previously traversed names that previously did not match any names in the name set may now match a name in the name set. Consequently, the sorted list may be traversed several times until the name set stops growing or until all of the names in the sorted list have been assigned to at least one name set. Further, the clustering process may be executed on an unsorted list; however, considerably more post processing and disambiguation may then be required.

As mentioned above, after any human curated mutable name sets have been consumed, the process may initialize or generate name sets starting from the top of the sorted list of person names. Accordingly, the clustering process initializes name set clusters using names that contain more information (i.e., are fuller) than names further down the sorted list, which provides for an efficient clustering process. Thus, the first name on the sorted list 440 may be selected as a supername for a particular name set, and any alternate names corresponding to the supername may be added to the name set as the process traverses the sorted list.

Figure 6:
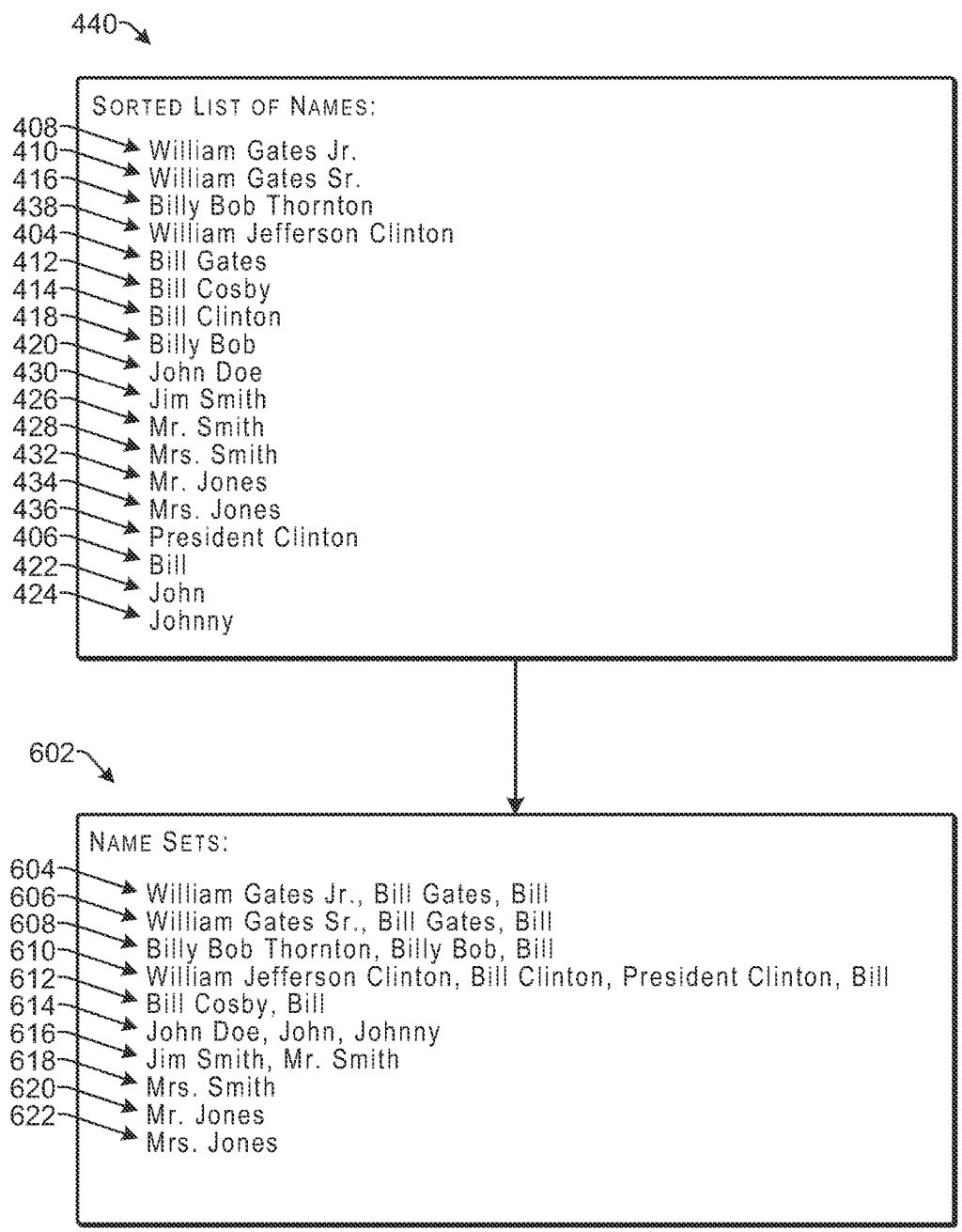
FIG. 6 illustrates an example of clustering a list of names according to some implementations.

FIG. 6 illustrates an example of clustering the sorted list 440 of names into name sets 602 according to some implementations. For example, as discussed above, the process may start with the first name in the sorted list 440 by selecting the name "William Gates Jr." 408 to be the supername for a first name set 604. The process may then traverse the sorted list 440 to locate alternate names that match the supername. Thus, in this example, the names "Bill Gates" and "Bill" are determined to match the supername without a conflict based on information from a list of nicknames or other external information that indicates that "Bill" is a nickname for "William." On the other hand, the name "William Gates Sr." would conflict because the suffix "Sr." conflicts with the suffix "Jr." in the supername. Accordingly, "Bill Gates" and "Bill" are added to the first name set 604, while "William Gates Sr." is not. Similarly, with respect to the sixth name set 614, "John Doe" is selected as the supername, while "John" is added to the sixth name set based on an exact match with the first name in "John Doe" and "Johnny" is added based on information from a list of nicknames or other external information that indicates that "Johnny" is a nickname for "John." Thus, the process may produce a plurality of name sets 604-622 from the sorted list 440.

Figure 7:
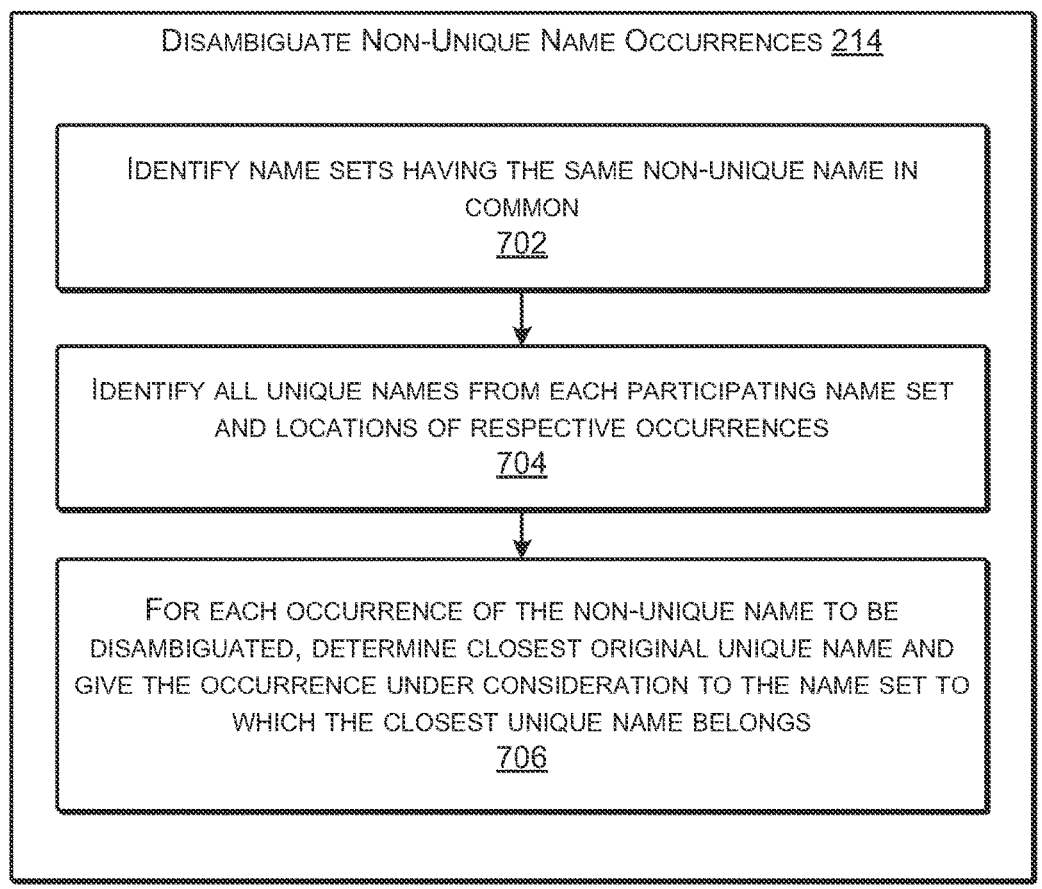
FIG. 7 is a flow diagram illustrating an example process for disambiguating non-unique name occurrences according to some implementations.

FIG. 7 is a flow diagram illustrating an example process 214 for disambiguating non-unique name occurrences according to some implementations. The process 214 may be performed by a computing device, such as a computing device of a digital work provider or other entity.

At 702, the process identifies name sets that include the same non-unique name for determining to which name set a particular occurrence of the non-unique name should be attributed. For example, in the name sets illustrated in FIG. 6, the first name set 604, the second name set 606, the third name set 608, the fourth name set 610 and the fifth name set 612 all include the non-unique name "Bill." There may be many occurrences of the name "Bill" in the digital work, but not all of the name sets necessarily should include an occurrence of "Bill." Accordingly, while the name "Bill" may be used in the digital work for more than one character and may properly belong to more than one name set, the process can disambiguate the multiple occurrences to assign particular occurrences of the non-unique name "Bill" to particular name sets. In other words, all of the occurrences of the unique name "William Gates Jr." belong to the first name set 604; however, not all of the occurrences of the non-unique name "Bill" may necessarily belong to the first name set. Accordingly, the disambiguation process 214 determines which occurrences of shared non-unique names belong to which name set.

At 704, to disambiguate a particular non-unique name, the process identifies all unique names from each participating name set that includes the non-unique name, and further identifies respective locations of each occurrence of the unique names. For example, the process may generate an ordered map of unique names from the participating name sets and the locations of occurrences of each unique name in the digital work. Thus, the process may determine the location of each occurrence of "William Gates Jr.," "William Gates Sr.," "Billy Bob Thornton," "Billy Bob," "William Jefferson Clinton," "Bill Clinton," "President Clinton," and "Bill Cosby" in the digital work.

At 706, for each occurrence of the non-unique name to be disambiguated, the process locates the closest occurrence of a corresponding unique name. Accordingly, a particular occurrence of the name "Bill" in the digital work may be attributed to the name set that includes an occurrence of a unique name that is closest to the particular occurrence of the name "Bill." For example, if an occurrence of "Bill Clinton" is closer to the particular occurrence of "Bill" than "William Gates Jr.," or any other unique name in the other participating name sets, the particular occurrence of "Bill" in the digital work is attributed to the name set 610 that includes "Bill Clinton."

Additionally, in some cases, the proximity determination may be weighted so that a unique name that precedes the non-unique name may be given a greater weight than a unique name that follows the non-unique name. For example, if a particular occurrence of "Bill" follows an occurrence of "William Gates Jr." by two hundred words, and an occurrence of "Bill Cosby" follows the same particular occurrence of "Bill" by 150 words, the particular occurrence of "Bill" may nevertheless be attributed to the name set that includes "William Gates Jr." despite the closer proximity of "Bill Cosby," based on a threshold distance for favoring preceding unique names over succeeding unique names. Other non-unique names such as "Bill Gates" in the example of FIG. 6 may be similarly disambiguated using the technique described above.

Figure 8:
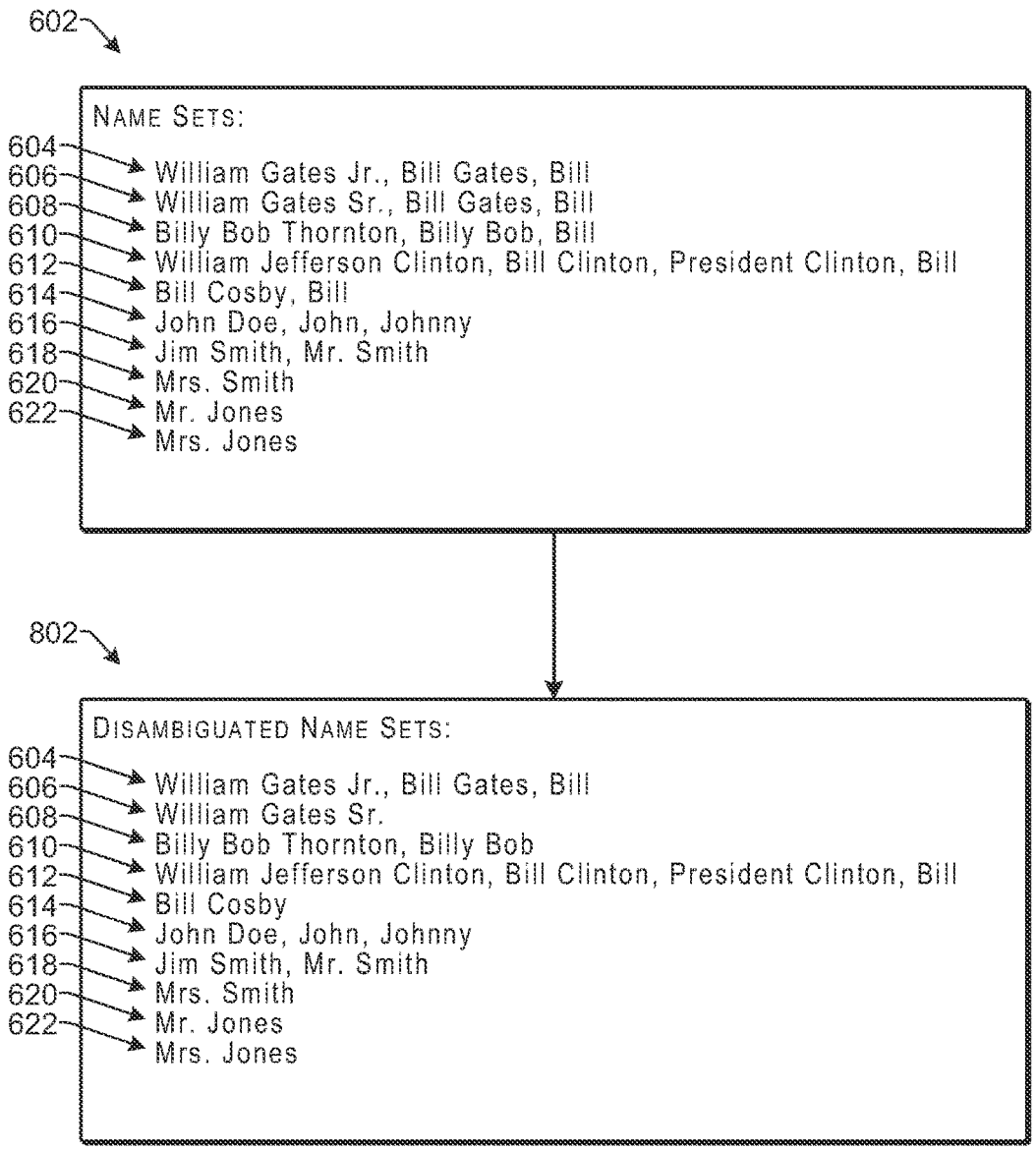
FIG. 8 illustrates an example of disambiguating non-unique clustered name occurrences according to some implementations.

FIG. 8 illustrates an example of disambiguating occurrences of non-unique names according to some implementations. In this example, the name sets 602 described above with respect to FIG. 6 are disambiguated to produce disambiguated name sets 802. Thus, the first name set 604 has been determined to include at least one occurrence of "Bill Gates" and "Bill," while the second name set 606 has been determined to not include either of these names. Similarly, "Bill" has also been removed from the third name set 608 and the fifth name set 612, as no occurrences of "Bill" were associated with the unique names in those name sets.

As discussed above with respect to FIG. 2, following the disambiguation of the non-unique names in the name sets, a character list or other character information may be generated, with each name set corresponding to a different character in the digital work. Furthermore, in some implementations, as discussed below, each character name set may be used to generate or identify a character object related to the digital work for which supplemental information may be provided. In addition, other types of named entities such as locations, organizations, things and the like may be similarly identified, clustered and disambiguated to identify other types of respective objects in the digital work.

Figure 9:
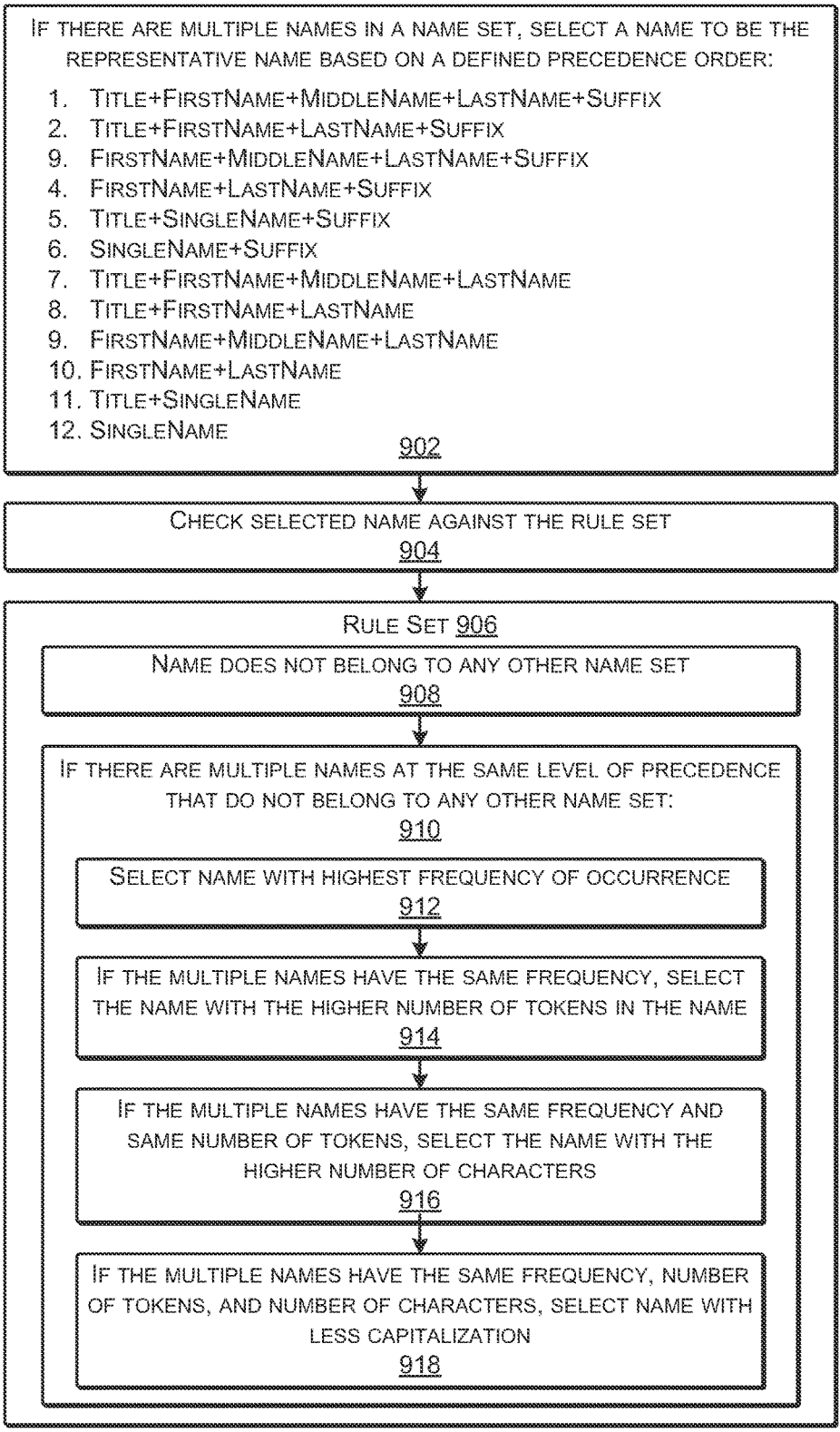
FIG. 9 is a flow diagram illustrating an example process for selecting a representative name according to some implementations.

FIG. 9 is a flow diagram illustrating an example of the process 204 discussed above with respect to FIG. 2 for selecting a representative name according to some implementations. For example, when there are multiple names included in a name set, a single one of the multiple names may be selected to represent the character corresponding to the name set. Thus, the selected name may be used to identify or refer to the character, such as when generating an index, or for otherwise providing supplemental information for the digital work. The process 204 may be performed by a computing device, such as a computing device of a digital work provider or other entity.

At 902, if there are multiple names in a name set, the process selects a name from the name set to be the representative name based on a defined precedence order. For example, the precedence order may give priority to a name that contains a maximum amount of information or that is fuller than any of the other names in a particular name set. Accordingly, a name that includes title+firstname+middlename+lastname+suffix may be selected before a name that merely includes firstname+middlename+lastname and both of these may be selected before single name. Furthermore, in some examples, names that include a suffix may be given priority for selection over names that do not include a suffix, as the inventors herein have determined that suffixes often uniquely identify a particular character. Additionally, the precedence order illustrated in FIG. 9 is just one example of a possible precedence order. Numerous other possible precedence orders will be apparent to those of skill in the art in light of the disclosure herein.

At 904, the process checks the selected name against a rule set 906. For example, the selected name should conform to the rules that are provided in the rule set 906.

At 908, the process checks, according to the rule set 906, that the selected name does not belong to any other name set. In other words, the selected name should be unique among all the name sets.

At 910, if there are multiple names at the same level of precedence that do not belong to any other name set, then additional rules are applied to determine which of the multiple names should be used as the representative name for the particular name set.

At 912, if the multiple selected names have the same level of precedence, the process selects the name with the highest frequency of occurrence in the digital work.

At 914, if the multiple selected names have the same frequency of occurrence in the digital work, the process selects the name with the higher number of tokens (e.g., words) in the name.

At 916, if the multiple selected names have the same frequency of occurrence and the same number of tokens in the name, the process selects the name with the higher number of characters in the name.

At 918, if the multiple selected names have the same frequency of occurrence, the same number of tokens in the name, and the same number of characters, the process selects the name with less capitalization. Further, the foregoing rules are merely examples of rules that may be applied in some implementations, and other rules will be apparent to those of skill in the art in light of the disclosure herein.

Example Architecture

Figure 10:
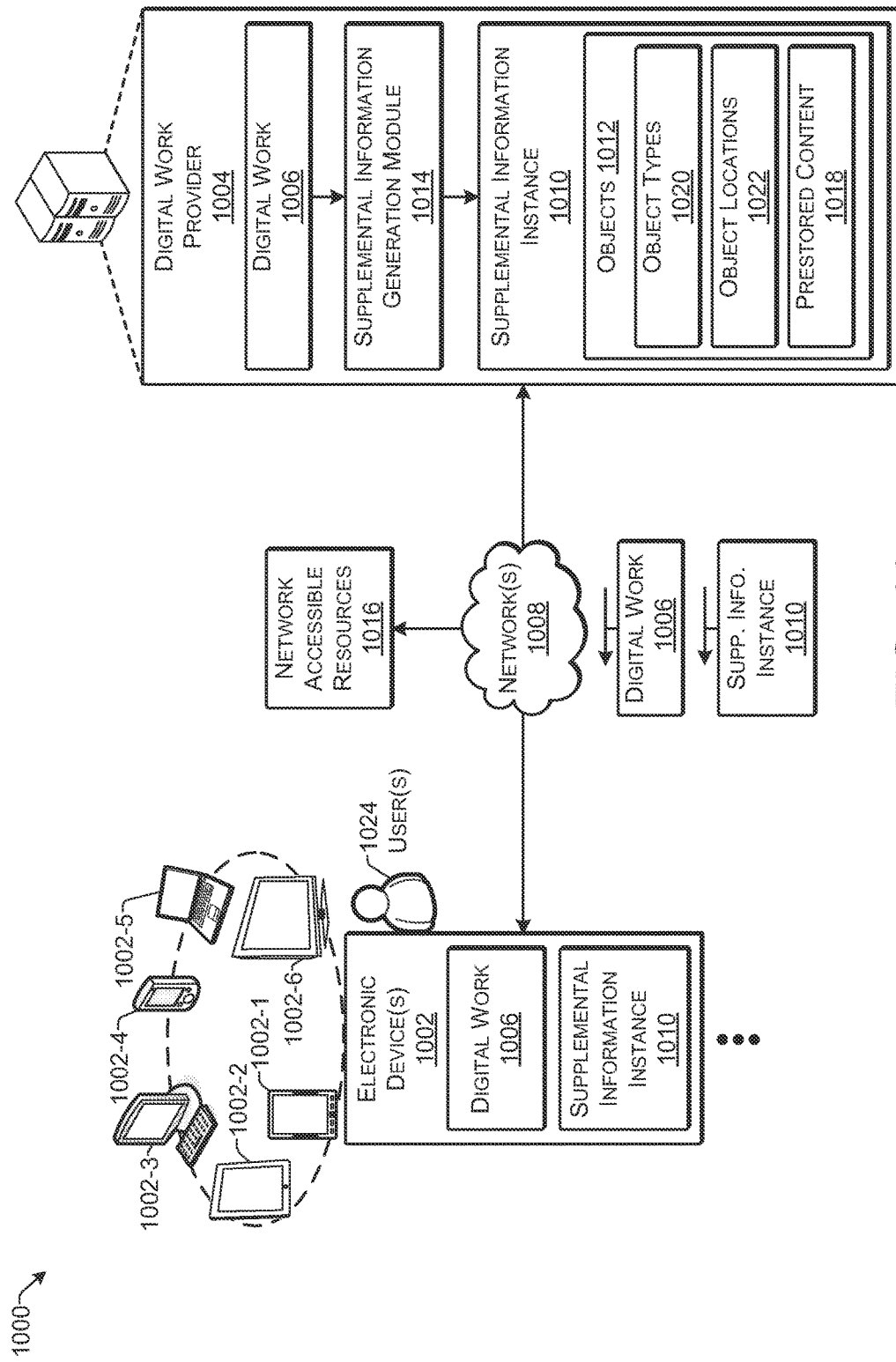
FIG. 10 illustrates an example architecture of a system for generating supplemental information for a digital work and providing the supplemental information to at least one electronic device according to some implementations.

FIG. 10 illustrates an example architecture of a system 1000 for generating supplemental information for a digital work and providing the supplemental information to one or more electronic devices 1002 according to some implementations. Some examples of the electronic device 1002 may include digital media devices and eBook readers 1002-1, tablet computing devices 1002-2, desktop, terminal and workstation computing devices 1002-3, smart phones and mobile devices 1002-4, laptop and netbook computing devices 1002-5, televisions, gaming systems and home electronic devices 1002-6, and any other device capable of accessing and rendering digital works, online content, mobile content, or the like.

The electronic device 1002 may communicate with a computing device of a digital work provider 1004 to access or receive at least one digital work 1006 over one or more networks 1008. In some implementations, the digital work 1006 may correspond to the digital work 102 discussed above with respect to FIGS. 1-9. The network(s) 1008 may include a local area network (LAN), a wide area network (WAN), such as the Internet, or any combination thereof, and may include both wired and wireless communication technologies using any suitable protocols and communication techniques. The digital work provider 1004 and the electronic device 1002 may communicate and interact with one another using any combination of suitable communication and networking protocols, such as Internet protocol (IP), transmission control protocol (TCP), hypertext transfer protocol (HTTP), and so forth. In some cases, the electronic device 1002 may download the digital work 1006, while in other cases the digital work 1006 may be streamed to the electronic device 1002.

The digital work provider 1004 may maintain an online location, such as a merchant website, an e-commerce site, or other functionality that offers one or more digital works 1006 to the public. Alternatively, the digital work provider 1004 may provide the digital work 1006 to one or more electronic devices 1002 through online or mobile applications executing on the electronic devices 1002 (not shown in FIG. 10).

In some examples, the digital work provider 1004 may generate a supplemental information instance 1010 for a respective digital work 1006 to provide information related to one or more terms, entities, or other objects 1012 in the digital work 1006. The digital work provider 1004 may receive the digital work 1006, such as from the publisher, author, or other source, and may process the digital work 1006 to make the digital work 1006 compatible with various display formats, device platforms, and so forth. The digital work provider 1004 may further execute a supplemental information generation module 1014, which may parse and analyze the digital work 1006 to produce the supplemental information instance 1010 that corresponds to the digital work 1006. For example, as discussed above with respect to FIGS. 1-9, the supplemental information generation module 1014 may analyze the digital work 1006 by identifying characters, people, things, phrases, places, organizations, topics, and other objects 1012 in the digital work 1006 that are of significance in the digital work 1006. In some examples, the supplemental information generation module 1014 may access various sources of information, such as network accessible resources 1016 for assistance in identifying objects 1012. Further, the supplemental information generation module 1014 may perform statistical analysis and use statistical modeling to assist in identifying the significant objects 1012 in the particular digital work 1006. Thus, the supplemental information generation module 1014 may identify entities in the digital work that are candidates to be made into objects 1012, such as by identifying proper names, place names, statistically improbable phrases, and the like, in the text of the digital work 1006. For instance, a statistically improbable phrase is a word or combination of words that occur in the text of a digital work one or more times in a manner that is outside of a predetermined threshold. If a particular phrase is used multiple times in a digital work, while not being used or being used rarely in a baseline of a large number of other digital works, this may indicate a statistically improbable phrase that is a candidate to become an object 1012 of the digital work 1006.

Additionally, to determine which candidate entities to make into objects 1012, the supplemental information generation module 1014 may access other sources of information outside of, or external to, the digital work 1006. For example, the supplemental information generation module 1014 may access the network accessible resources 1016 that may include online sources of information, such as Wikipedia®, Shelfari®, IMDb®, online dictionaries, discussion forums, social networking sites, community sites, crowd-sourcing sites, or other online resources, which may provide information or clues to assist in performing identification of characters and other significant phrases, organizations, things, events, places, topics, etc., in the digital work 1006. Further, the supplemental information generation module 1014 may obtain additional information or content on the objects identified in the particular digital work 1006, such as by obtaining definitions or other information for these objects from various network locations, such as the authoritative sources mentioned above.

Further, if the digital work 1006 is already in circulation, the supplemental information generation module 1014 may access reader information, such as popular highlights or annotations made by readers of the digital work 1006. For instance, the digital work provider may track which portions of a particular digital work 1006 are commonly highlighted or annotated by readers of the digital work 1006. Additionally, the supplemental information generation module 1014 may access lists of names for identifying proper names, nicknames, slang names, place names, and the like.

Following identification of the objects 1012 in the digital work, the supplemental information generation module 1014 may identify or obtain, from the network accessible resources 1016, where available, excerpts of description, definitions, or other information or content related to identified objects 1012 in the particular digital work 1006. For example, the supplemental information generation module 1014 may obtain content on an object, such as an excerpt from a Wikipedia® article, a Shelfari® or IMDb® listing, or the like, to include with the supplemental information instance 1010 as prestored content 1018 for the objects 1012 identified in the particular digital work 1006. In other examples, the supplemental information generation module 1014 determines the network resource location of the content containing information about the object, and merely includes a reference identifier to the network location of the content, rather than providing the content itself, with the with supplemental information.

In addition, for each object 1012, the supplemental information generation module 1014 may identify an object type 1020 and one or more object locations 1022. For example, as described additionally below, each word in a digital work may be assigned a specific location, and the location may be used to identify the location of each occurrence of an object 1012 identified in the digital work 1006. Accordingly, every occurrence of an object 1012 in the digital work 1006 may be quickly located based on the designated object locations 1022.

Further, when the objects 1012 are identified, an object type 1020 may be assigned to an object 1012 based on various gathered information, such as whether a word is a proper noun, usage of the word within the digital work 1006, such as usage in connection with dialogue, presence of prefixes or suffixes, such as Mr., Ms., Junior, etc., and based on any external information obtained from network accessible resources 1016, lists of alternate names, nicknames, name databases, and the like. Accordingly, a large number of clues and indicators may be considered for determining whether a particular object 1012 is a character, place, organization, topic, thing, or so forth.

When a user 1024 of the electronic device 1002 accesses, purchases or otherwise requests or obtains a particular digital work 1006, such as through interaction with the digital work provider 1004, the digital work provider 1004 may make the particular digital work 1006 available for delivery to the electronic device 1002. The digital work provider 1004 may also deliver, or make available for delivery, the corresponding supplemental information instance 1010 for the particular digital work 1006. For example, the particular digital work 1006 and the corresponding supplemental information instance 1010 may be downloaded contemporaneously from the digital work provider 1004, e.g., as a package or as a sequential download. Alternatively, the digital work 1006 and the corresponding supplemental information instance 1010 may be provided to a third party, such as a wireless provider that sends the digital work and the supplemental information instance 1010 to the electronic device 1002. Other variations will also be apparent to those of skill in the art in light of the disclosure herein.

Figure 11:
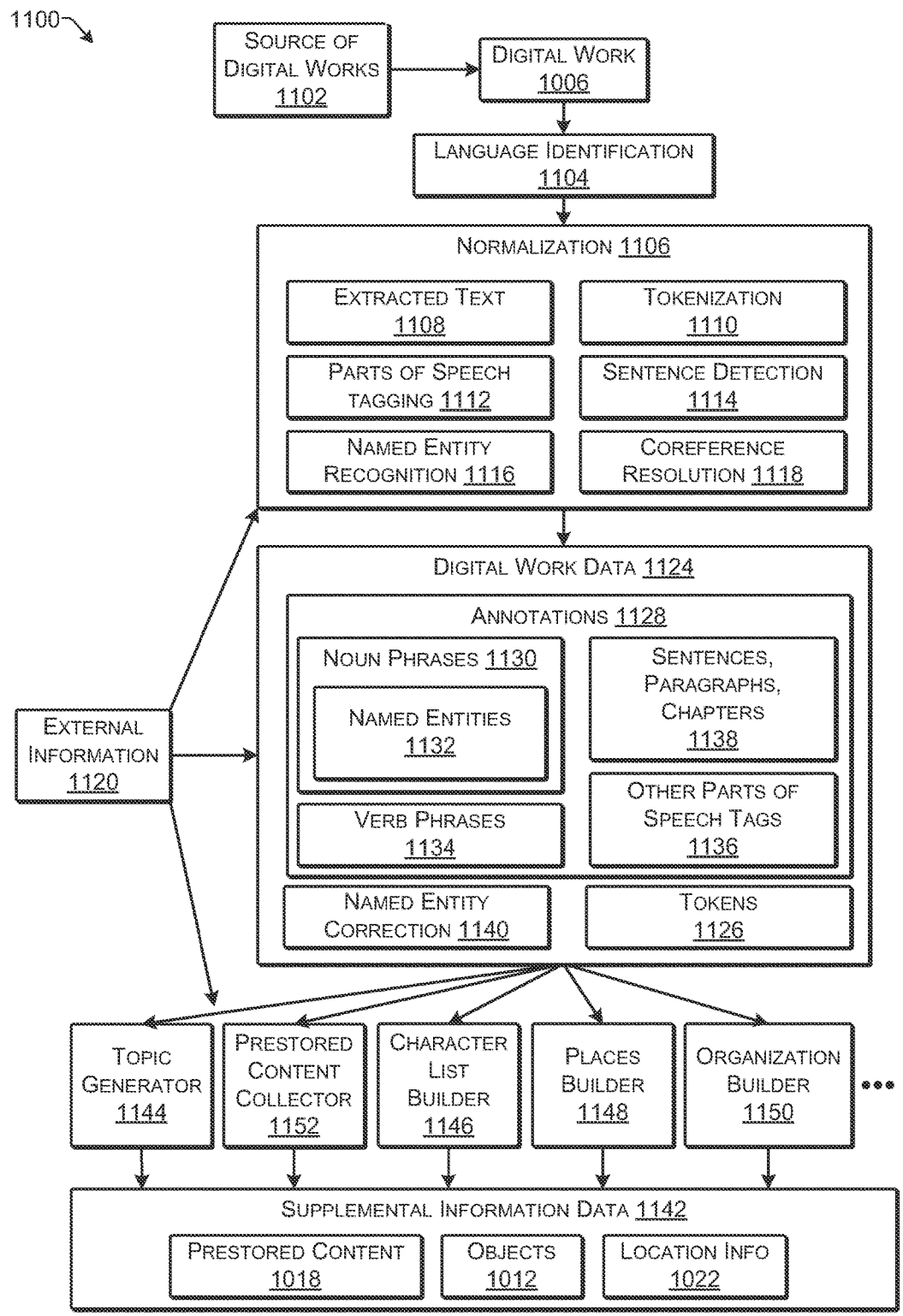
FIG. 11 illustrates an example framework that may be employed for generating supplemental information according to some implementations.

FIG. 11 illustrates an example framework 1100 that may be employed by the supplemental information generation module 1014 of the digital work provider 1004 for generating supplemental information data according to some implementations. In this example, the digital work provider 1004 may receive a digital work 1006 from a source of digital works 1102, such as from a publisher, an author, a digital work library, or other source of digital works. The digital work 1006 may optionally undergo language identification, as indicated at 1104 to identify the language in which the text associated with the digital work 1006 is written. Further, since digital works may be stored in a variety of different formats, the text of the digital work 1006 may be normalized, as indicated at 1106, by extracting the raw text from the digital work 1006 to obtain extracted text 1108. The normalization 1106 may include tokenization 1110 of the extracted text 1108 of the digital work 1006. As discussed additionally below with respect to FIG. 12, tokenization 1110 may include parsing the text of the digital work into tokens that may include individual words, punctuation marks, symbols, etc., contained in the text of the digital work, and associating location information with each token identified in the digital work 1006. Thus, each word or punctuation mark in the text of the digital work 1006 may be assigned a unique location sequence or value, such as based on an offset of the token from the beginning of the digital work and a number of characters in the token, which may be referred to as the length of the token.

Furthermore, normalization 1106 may include, or may be followed by, parts of speech tagging 1112 and sentence detection 1114. Parts of speech tagging 1112 may include identification of parts of speech in the text of the digital work 1006, such as noun phrases, verb phrases, and various other parts of speech that may be of interest for identifying objects 1012 discussed above. Thus, each token may be associated with at least one part of speech. In addition, sentence detection 1114 may include identifying sentences, paragraphs, and chapters contained in the digital work 1006. In some examples, as discussed additionally below with respect to FIG. 12, the parts of speech, the identified sentences, and so forth, may have location information associated therewith that includes a start identifier, a length, and a type. For instance, a length of a sentence or a part of speech may refer to the number of tokens in the sentence or the part of speech, while the start identifier may be identified using the first token in the sentence or part of speech. Furthermore, in some examples, the parts of speech tagging may be performed incrementally one sentence at a time.

Additionally, normalization 1106 may include, or may be followed by, named entity recognition 1116 and coreference resolution 1118. For example, named entity recognition 1116 may include recognizing entities in the digital work, such as names of people, places, organizations, certain numerical expressions, quantities, and so forth. For example, proper nouns, such as names of people, places, organizations, and the like, may be identified based on various lists of names, or other techniques for detecting and distinguishing these separate types of entities. Furthermore, in some cases, external information 1120, that is external to the digital work 1006, may be employed to assist in named entity recognition, such as by referring to the network accessible resources 1016 discussed above with respect to FIG. 10, or other suitable resources such as files or databases of names, nicknames, places, organizations, etc. In addition, coreference resolution 1118 may involve identifying occurrences in the digital work 1006 in which multiple different expressions or pronouns refer to the same thing in the digital work 1006.

The normalization 1106, including the operations described above, results in digital work data 1124 that may include tokens 1126 and annotations 1128. The annotations 1128 may include noun phrases 1130, which may include for example, named entities 1132, such as people/characters, places, organizations, as well as other nouns and noun phrases identified in the digital work 1006. The annotations 1128 may further include verb phrases 1134 and other parts of speech tags 1136 identified in the digital work 1006. The annotations 1128 may further include information on sentences, paragraphs and chapters 1138 identified in the digital work 1006.

Additionally, in some instances, named entity correction 1140 may be performed for named entities 1132 identified in the digital work data 1124. As one example, an employee of the digital work provider 1004 may check the named entities 1132 in the digital work 1006 for accuracy. As another example, external information 1120 may be applied for checking the named entities 1132 in the digital work data 1124. For example, the named entities 1132 for the digital work 1006 may be posted to a network accessible resource, and crowd-sourced information may be relied on for correcting any errors in the named entities 1132 for the digital work 1006. Thus, the named entities 1132 may be posted to a community website, such as Shelfari®, that includes an entry for the digital work 1006, and visitors to the community website may provide information to correct any errors in the named entities 1132, selected objects 1012, or the like. As another example, users who receive the supplemental information with a digital work may note an error in the supplemental information and may provide the external information 1120 used for named entity correction 1140. Accordingly, crowd-sourced information and crowd-sourced corrections may be used in some cases to perform named entity correction 1140.

The digital work data 1124 may be used to generate supplemental information data 1142, which may include a variety of supplemental information that may be presented to a user to supplement the user's experience when consuming a digital work. For example, a topic generator 1144 may employ external information 1120 to generate one or more topics from the digital work 1006. For example, the topic generator 1144 may generate a set of useful topics based on a detection of what the digital work is generally related to and by extension where to find more information about the identified topics such as in other digital works. For example, the topic generator 1144 may access Wikipedia or other network accessible resources 1016 to determine which of the noun phrases 1130 or other terms identified in the digital work 1006 have more information available from the network accessible resources 1016. Further, one or more weighting or ranking factors may be taken into consideration to identify those topics that may be more relevant to the digital work, such as topics that appear multiple times in the digital work, topics that are linked to other topics in the digital work, and so forth.

In addition, as discussed above with respect to FIGS. 2-9, a character list builder 1146 may build a list of characters from the named entities 1132 in the digital work 1006 that are identified as corresponding to people or characters. For example, the names corresponding to people in the digital work 1006 may be identified as described above, such as through lists of common names, presence of titles and suffixes, lists of nicknames, and so forth. The person names in the list may be further sorted according to the fullness of name, i.e., whether both first name and last name is provided, whether just a first name or just a surname is provided, etc. The names may subsequently be clustered, and the names in the name sets may further be disambiguated, as described above. For example, characters are often referred to by multiple different names in a digital work. As one example, the expressions "the tin man," the "Tin Woodman," "the Woodman," and "Nick Chopper" are all used to refer the Tin Woodman character in L. Frank Baum's series of Oz books. Accordingly, the character list builder 1146 attempts to associate these various different expressions with a single character. In some instances, external information 1120 may be employed by the character list builder 1146, such as by referring to the network accessible resources discussed above, e.g., with respect to FIGS. 1 and 10, or other suitable resources, such as files or databases of names, nicknames, places, organizations, etc.

Additionally, each person name that is identified may be mapped to a set of annotations in the digital work. For example, the name "John" might be mapped to 100 annotations because the named "John" occurs 100 times in the digital work. Furthermore, in some cases, a name may occur in two or more name sets because the digital work may contain two or more characters with the same name or alias. For example, a digital work that discusses both "Bill Clinton" and "Bill Cosby" might have the name "Bill" used by itself in the text of the digital work. In such a case, the various techniques described above may be used to determine which character or person the single "Bill" may refer to, such as by determining a distance from an annotation that includes both "Bill" and a last name.

The character list builder 1146 may use the clustered and disambiguated names to create characters for the digital work including the locations of each occurrence of each character in the digital work. The character list builder 1146 may further determine which name to use as the representative or primary name for a particular character, such as based on a fullness or amount of information in the name.

A places builder 1148, an organization builder 1150, and various other object builders (not shown in FIG. 11) may be included to identify the various objects and the locations of the various objects in the digital work. For example, the places builder 1148 may identify and cluster places that are the same but that are referred to by different names such as by clustering "the English Channel" with "the Channel," in a manner similar to that described above with respect to the character list builder 1146. Similarly, the organization builder 1150 may use similar techniques to identify organizations such as corporations, groups, teams, institutions, associations, clubs, societies, and so forth, discussed in the digital work. Other object builders may be included for various other objects such as things, themes, scenes, events, interesting or popular phrases, popular highlights, citations, relationships between characters, interactions between characters, time periods, and so forth.

In addition, a prestored content collector 1152 may collect and store content related to the objects 1012 identified in the digital work 1006. For example, the prestored content collector 1152 may access the network accessible resources 1016 described above to determine whether any descriptive information is available for each of the objects 1012 identified in the digital work 1006. The prestored content collector 1152 may collect the content available for each object and associate the content with the object. Furthermore, in some cases the content may be of a length that is longer than desirable to be presented to a user electronic device. In such a case, the prestored content collector 1152 may truncate the descriptive material such as by only including the first paragraph of an article or the like.

Additionally, the prestored content is not limited to text content. In some instances, the prestored content may include an audio clip that demonstrates proper pronunciation of an object, such as a character's name or other phrases or words in a digital work. As another example, when the digital work is an eBook, and there is a movie that corresponds to the eBook, one or more video clips or images from the movie may be provided as the prestored content. As one example, some of the video clips may correspond to particular scenes identified as objects in the supplemental information. As another example, some of the video clips may depict particular characters and these video clips may be included in the prestored content in association with names of the corresponding particular characters. Accordingly, a large variety of prestored content may be included with the supplemental information, with the foregoing being just several illustrative examples.

In addition, for each object 1012 identified in the digital work 1006, such as by the character list builder 1146, the places builder 1148, the organization builder 1150, the topic generator 1144, and so forth, the supplemental information generation module 1014 may select an excerpt of text from around the object 1012 to enable the object 1012 to be displayed in context with the excerpt of surrounding text. For example, the supplemental information generation module 1014 may identify a location of each occurrence of each object 1012 and may select a portion of text surrounding the occurrence of the object based on various factors, such as sentence breaks and other punctuation, up to a maximum threshold amount of text permitted before and after the object. The supplemental information generation module 1014 may determine the start location and end location of the excerpt as well as the location of the object occurrence to be highlighted within the excerpt.

Furthermore, while several examples of supplemental information had been described above, numerous other types of supplemental information may be included in the supplemental information data such as images, maps, videos, audio information and the like. As another example, the user may be presented with an option of accessing dictionary definition information for a selected object.

Figure 12:
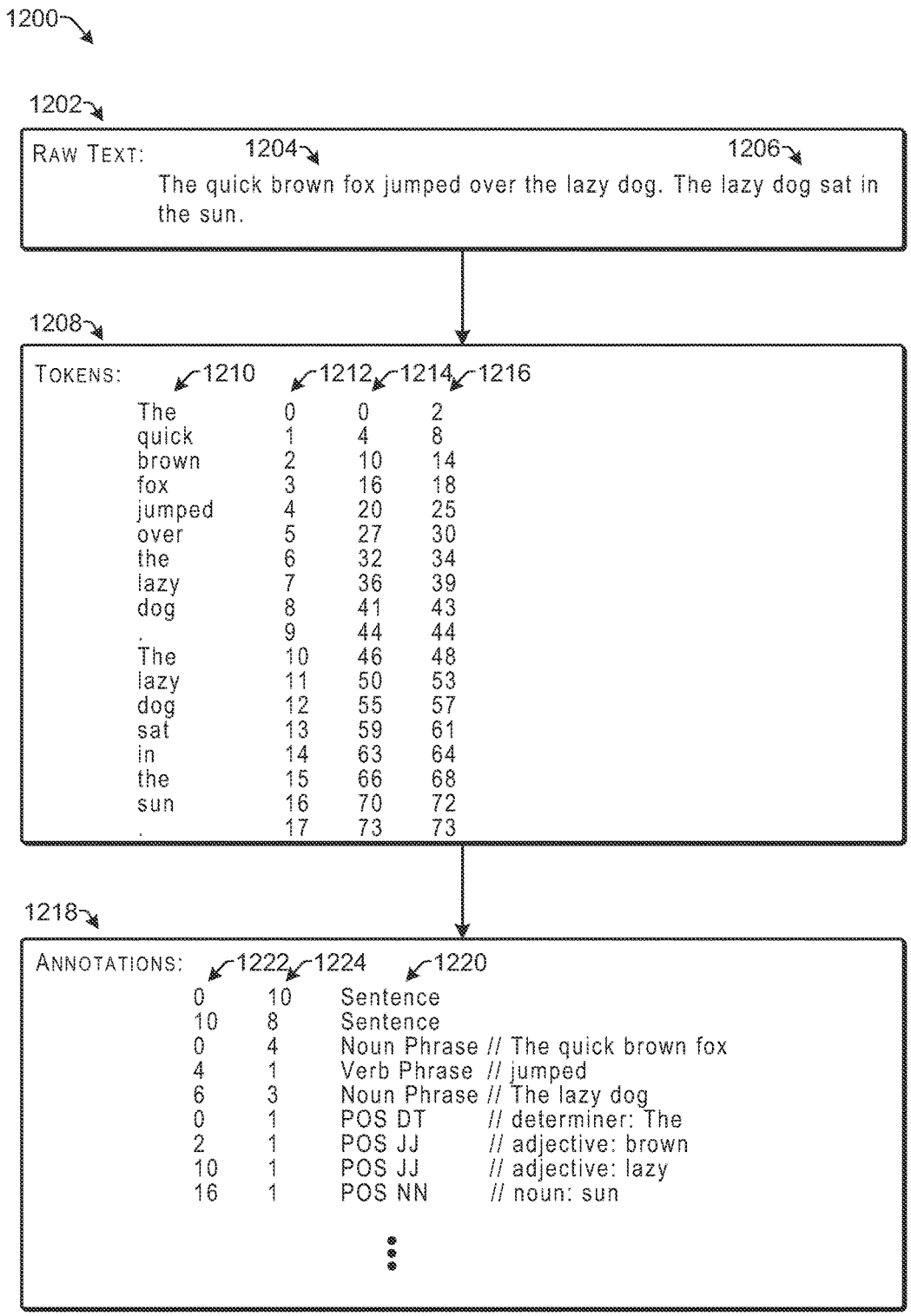
FIG. 12 illustrates an example framework for determining tokens and annotations from raw text according to some implementations.

FIG. 12 illustrates an example framework 1200 for determining text tokens and annotations from raw text 1202 according to some implementations. In this example, suppose that the digital work has raw text 1202 that includes a first sentence 1204, "The quick brown fox jumped over the lazy dog," and a second sentence 1206, "The lazy dog sat in the sun." The raw text 1202 may be parsed or divided into token information 1208. For example, each word and punctuation mark in the text 1202 may be identified as a separate token 1210. Alternatively, in other examples, only words are identified as tokens and punctuation marks are treated as parts of adjacent words or as spaces.

Location information may be assigned to or associated with each token 1210 based on the number of characters, such as letters, numbers, spaces, or punctuation marks. The location information may include a sequentially assigned token number 1212, a start location or offset 1214 and an end location 1216. Thus, the word "The" may be the first token in the digital work, and therefore has a token number of "0" as the first token in the digital work. Further, the start location of "The" is also "0," and the end location of "The" is "2" since there are three characters in "The". Next, "quick" is the second token in the digital work and so has a token number of "1." Further, the start location of "quick" is "4" (counting the space between "The" and "quick"), and the end location of "quick" is "8" since there are five characters in "quick." Thus, the entire text of the digital work may be divided into tokens in this manner and each token may be associated with unique location information that identifies the location of the token within the digital work.

Furthermore, annotation information 1218 may be determined from the raw text 1202 and the token information 1208. For annotations, the location is determined based on numbering of tokens, rather than individual characters. For example, annotations 1220 may refer to sentences, paragraphs, chapters, or parts of speech, such as noun phrases, verb phrases, as well as other parts of speech such as determiners, adjectives, nouns, adverbs, pronouns, fonts, emphasis on a work, and so forth. Location information associated with each annotation 1220 may indicate a start location 10222 and a length 1224 of each annotation 1220 in terms of tokens. For example, the first sentence 1204 starts at start location "0" (i.e., the first token), and is "10" tokens in length. Similarly, the second sentence 1206 starts at location "10," and is "8" tokens in length. Thus, the annotation information 1218 may specify particular locations of annotations within the digital work based at least in part on the locations of the tokens that are included in each annotation.

Figure 13:
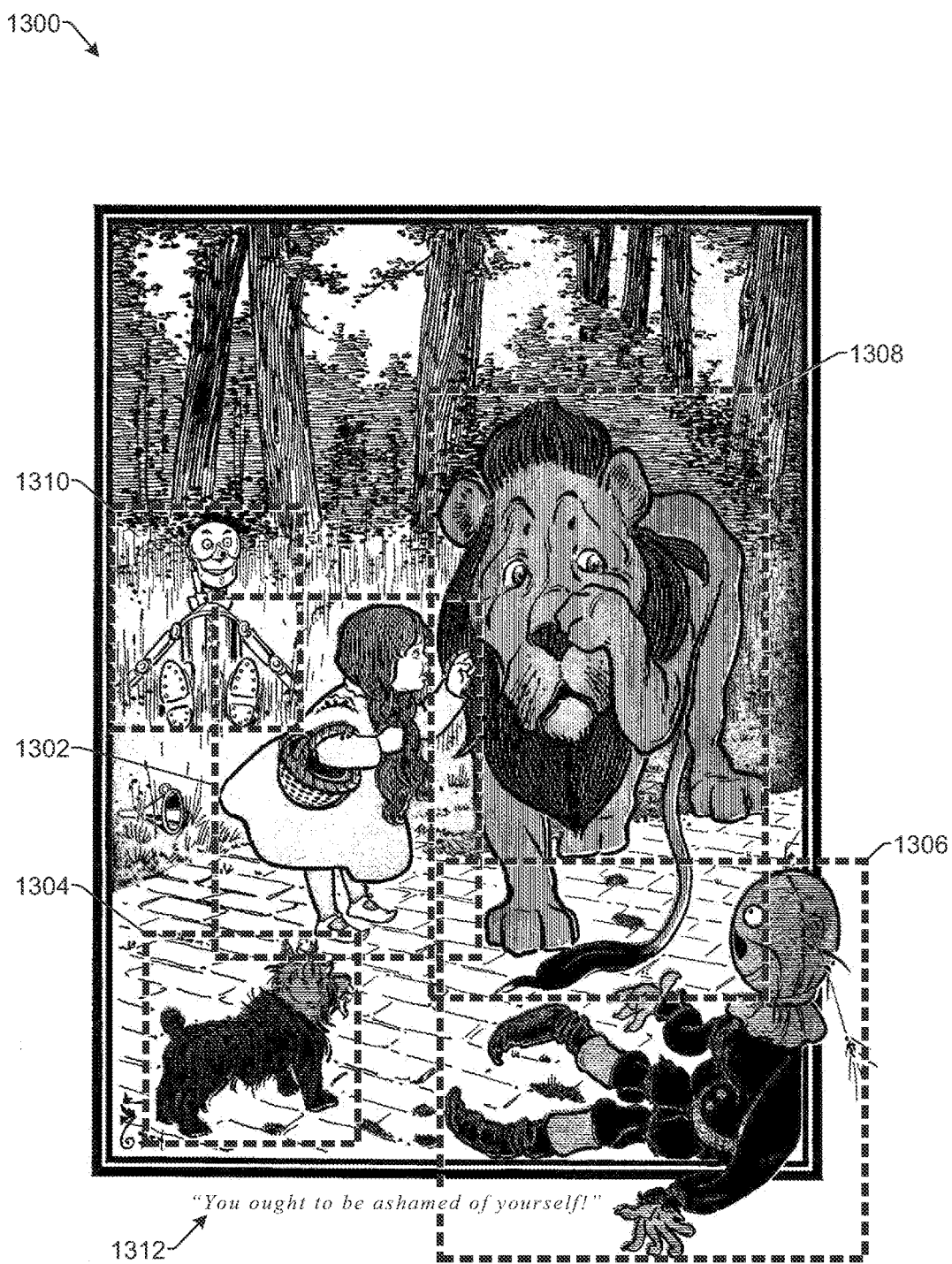
FIG. 13 illustrates an example of determining token locations using coordinates according to some implementations.

Additionally, or alternatively, as illustrated in FIG. 13, the location of a token (and thereby the location of an annotation or object) may be identified or specified using other location identification techniques. For example, the location of each token may be identified according to the coordinates of each token on a page or within an image. For instance, a token may be an image or a portion of an image. Thus, the coordinates of the image or the portion of the image may be identified by a page number on which the image appears and a set of x-y coordinates (i.e., in a plane of the displayed page) or other suitable coordinates.

In the example of FIG. 13, suppose that the digital work is Frank L. Baum's *The Wonderful Wizard of Oz*, and an image 1300 in the digital work includes multiple characters, such as Dorothy, Toto, the Scarecrow, the Cowardly Lion and the Tin Woodman. A first portion 1302 of the image, as indicated by a dashed-lined rectangle, may be identified as including Dorothy, a second portion 1304 of the image may be identified as including Toto, a third portion 1306 of the image may be identified as including the Scarecrow, fourth portion 1308 of the image may be identified as including the Cowardly Lion, and a fifth potion 1310 of the image may be identified as including the Tin Woodman. In some examples, the characters may be recognized and identified in the image 1300 by an employee of the digital work provider or by a member of a community or crowd-sourced information website, such as Shelfari®. In other examples, the characters may be recognized and identified automatically using one or more image recognition algorithms that identify the characters based on comparison with other available images of the characters, stock image collections of dogs, girls, lions, scarecrows, and so forth.

Each of these image portions 1302-1310 may be a token and may have location information associated therewith. For example, the location information may identify a page or location number for the overall image and coordinates of the particular image portion on the page or at the location in the digital work. As one example, a rectangle that bounds a token may be used to identify a location of a token based on x-y coordinates of two diagonally opposed corners of the rectangle, such as coordinates of the upper left corner and the lower right corner of the rectangle. Alternatively, the location of the bounding rectangle may be identified by a coordinate of a single corner and a width and a height of the rectangle. Other shapes, such as a circle, oval, triangle, octagon, and so forth, may be used in place of a rectangle for identifying a token location and/or image portion. Additionally, the rectangles corresponding to the image portions 1302-1310 may not normally be visible, but a user may select a particular image portion to highlight or otherwise select one of the image portions 1302-1310, such as for selecting a selectable object to view supplemental information, as discussed below with respect to FIG. 15.

Further, a combination of text offsets and coordinates may be used for identifying token locations. For example, the image 1300 of FIG. 13 includes the caption 1312: "You ought to be ashamed of yourself!" This text may be tokenized as described above with respect to FIG. 12 based on the words and punctuation marks contained therein. Thus, in some examples, the location of the words and punctuation marks in the caption 1312 may be tokenized using a text-based offset, by simply continuing from the text of the immediately previous page. In other examples, the location of the text and punctuation marks in the caption 1312 may identified using coordinates of the words and punctuation marks. For example, a location of a bounding box for each word or punctuation mark may be identified. Additionally, in some examples, the entire text of a digital work may be tokenized using coordinate locations rather than text offset. Furthermore, various other techniques for generating tokens and identifying the locations of tokens will also be apparent to those of skill in the art in light of the disclosure herein, with the foregoing being merely several non-limiting examples.

Example Structure

Figure 14:
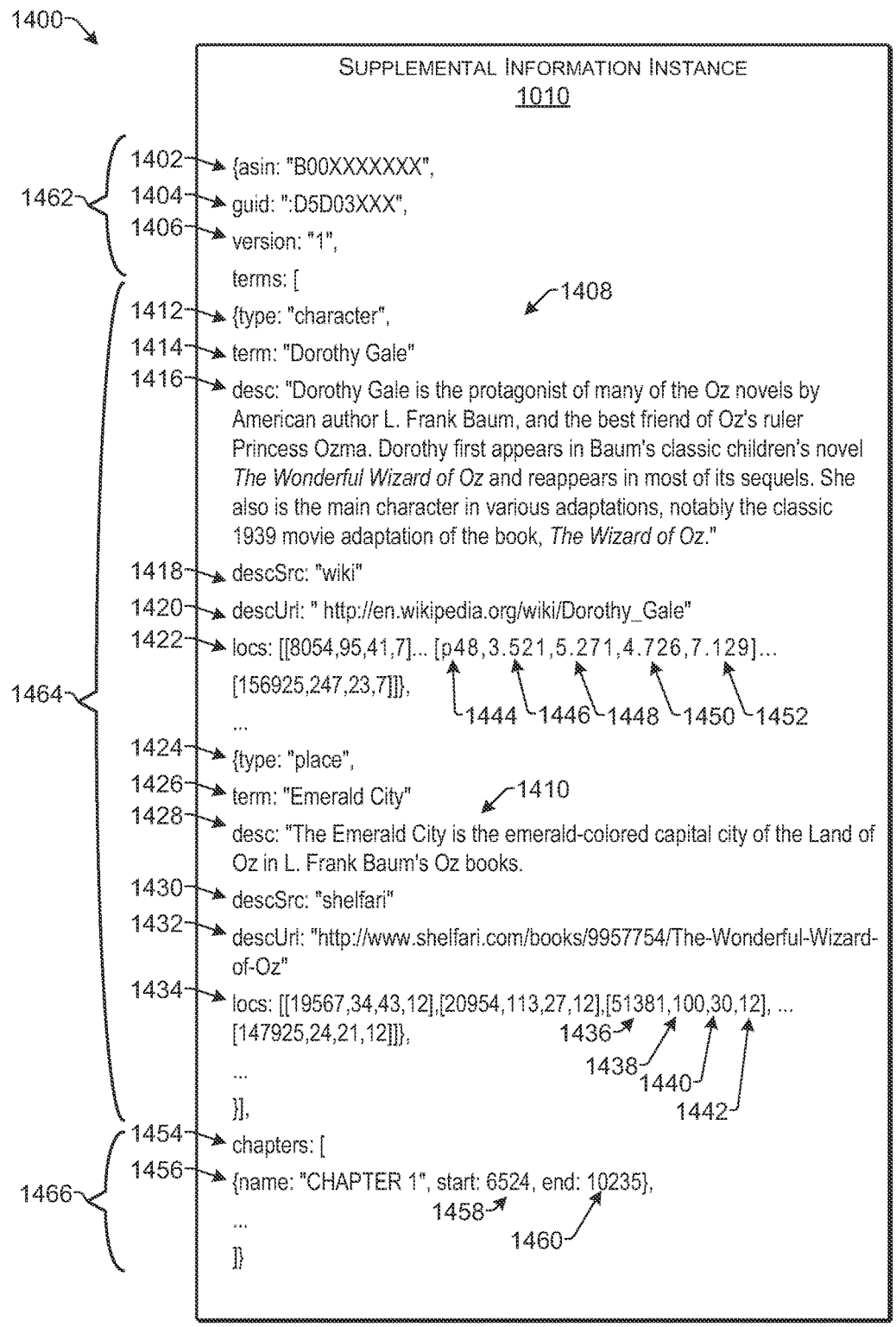
FIG. 14 illustrates an example structure of a supplemental information instance for a digital work according to some implementations.

FIG. 14 illustrates an example structure 1400 of the supplemental information instance 1010 for the digital work 1006 according to some implementations. In this example, the structure 1400 is formatted according to the JSON (JavaScript Object Notation) standard; however, implementations herein are not limited to any particular standard, programming language, protocol, or the like.

The structure 1400 includes an identifier 1402 that identifies the digital work 1006 to which the supplemental information instance 1010 corresponds. For example, the identifier 1402 may be any suitable identifier, such as an ASN (Amazon Standard Identification Number), a 9-digit or 13-digit ISBN (International Standard Book Number), an ISSN (International Standard Serial Number), an LCCN (Library of Congress Control Number), or any other suitable identifier that can be used to correlate the supplemental information with the correct corresponding digital work. For example, in some cases, the identifier 1402 may merely be the title of the digital work, an arbitrarily assigned number, or the like. The structure 1400 may further include other header information such as a GUID 1404, which may be a globally unique identifier for the file content of the digital work; and a version 1406, which may indicate a format version of the structure 1400.

The structure 1400 may further include object information for one or more terms or objects in the digital work 1006. In the illustrated example, first object information 1408 is included for the character "Dorothy Gale," and second object information 1410 is included for the place "Emerald City," although object information for numerous other objects may be included in the structure 1400. The object information 1408 includes an object type 1412, which in this example is a "character," an object term 1414, "Dorothy Gale," which is the representative name for the object, and an object description 1416. The object description 1416 may be an excerpt or description obtained from one or more network accessible resources 1016, as described above. In this example, the description is an excerpt obtained from a Wikipedia® article on the character Dorothy from *The Wonderful Wizard of Oz*. Accordingly, a description source 1418 may indicate that the source of the description is Wikipedia®, and a description URL 1420 may indicate the URL from which the prestored content description 1416 was drawn. For instance, a user having network connectivity may access the description URL 1420 for performing further reading on the particular object. Additionally, in some examples, the description URL 1420 may be provided instead of the prestored content in the description 1416. Further, location information for one or more locations 1422 of occurrences of the object are included to identify the locations of one or more respective occurrences of the object in the digital work.

Similarly, the object information 1410 includes an object type 1424, which in this example is a "place," an object term 1426, "Emerald City," which is the primary name for the object, and an object description 1428. In this example, the description is an excerpt that may have been obtained from a Shelfari® listing on the Emerald City under the entry for *The Wonderful Wizard of Oz*. Thus, a description source 1430 may indicate that the source of the description is Shelfari®, and a description URL 1420 may indicate the URL from which the descriptive content was drawn. One or more locations 1434 are included to identify the location of one or more respective occurrences of the object in the digital work. Further, while two types of objects have been illustrated in this example for discussion purposes, numerous other objects and other types of objects, as enumerated above, may be included in the structure 1400 and similarly formatted.

The locations 1422, 1434 provided for the objects may include four or more values that represent an excerpt of text from the digital work and one or more object occurrences to highlight in the excerpt. For example, suppose an excerpt of text goes from location 51381 to location 51481 and contains a highlighted object occurrence at 51411 to 51423. This may be expressed using four discrete numbers or values to represent both the excerpt and the highlighted term within the excerpt. The first value 1436 in the location information represents the starting location of the excerpt in the digital work as an offset from the beginning of the digital work, as discussed above with respect to the tokens of FIG. 12. Thus, in this example, the starting location is "51381" as indicated at 1436. In addition, the length of the excerpt is "100" positions (e.g., each position may correspond to one character, space or punctuation mark), with the object to be highlighted starting 30 positions into the excerpt. Accordingly, the second value 1438 in the location information, which is "100" in this example, indicates the length of the excerpt (or the number of positions in the excerpt). The third value 1440 indicates the starting location (30) of the object occurrence in the excerpt, and the fourth value 1442 indicates the length (12 positions or characters) of the object in the excerpt. Thus, the location numbering enables extraction of an excerpt of text from the digital work and highlighting of the object in context in the excerpt. Further, when more than two objects are contained in a single excerpt, then six numbers may be used to represent the locations of the two objects within the single excerpt, with the last two values representing the start location and length of the second object to be highlighted in the excerpt.

In addition, it may be noted that the locations associated with each object in the structure 1400 provide an index for locating other occurrences of a selected object. Thus, by grouping the locations of the occurrences of an object with one another in the manner described in FIG. 14, name merging of alternate names may be automatically provided for so that listing of separate alternate names in the structure 1400 is not necessary. For example, suppose that a digital work contains separate occurrences of the names "Dorothy," "Dorothy Gale," and "Miss Gale." These alternate names may be clustered and disambiguated by the character list builder, as described above, to all relate to the single character "Dorothy Gale." Accordingly, the locations of the different occurrences of "Dorothy" and "Miss Gale" may be included in the locations 1422 for "Dorothy Gale." Consequently, if a user selects an occurrence of the object "Dorothy" in the text of the digital work, the location of the selected object is used to identify the object information 1408 for the selected object, and thereby to identify all other occurrences of the object, regardless of whether the occurrences are "Dorothy," "Miss Gale," or "Dorothy Gale." Consequently, merging of alternate names is automatically achieved through the use of locations to identify selected objects, thereby negating the need to have separate object information listings for "Dorothy," "Miss Gale," and "Dorothy Gale.

In addition, in some examples, the location information 1422, 1434 may include location information related to other digital works as well. For example, suppose that the supplemental information instance 1010 corresponds to *The Wonderful Wizard of Oz*. Furthermore, suppose that the Dorothy Gale character appears in a number of other Oz books. Location information may be included for those other Oz books as well, as discussed additionally below, to enable displaying of supplemental information for an object across a series or other plurality of digital works. As one example, the location information for locations outside a particular digital work may include a fifth value that may be the digital work identifier 1402 described above for the other digital work.

In addition, as discussed above with respect to FIG. 13, in some cases, the location information for some or all of the objects may be based on a coordinate system, rather than, or in addition to, a text offset. In the illustrated example of FIG. 14, the location information 1422 for Dorothy Gale includes both text offset location information (i.e., "[8054,95,41,7]," and "[156925,247,23,7]"), as well as coordinate system location information ("[p48,3.521,5.271.4.726,7.129]"). The coordinate system location information in this example includes a page number 1444, a first x-axis coordinate 1446, a first y-axis coordinate 1448, a second x-axis coordinate 1450, and a second y-axis coordinate 1452. Thus, the first x and y coordinates 1446, 1448 may identify a location of a first corner of a bounding box and the second x and y coordinates 1450, 1452 may represent a location of a second corner of a bounding box that encompasses a particular token. For example, the coordinate system location information in this example may describe position of a rectangle that include an image of Dorothy, as discussed above with respect to FIG. 13. As an alternative, the second two values 1450, 1452 may be a width and height of a bounding box having a corner located at the first two coordinates 1446, 1448. Still alternatively, in the case that a bounding circle is used, rather than a bounding box, the first two coordinates may be a location of a center of the circle and only one additional value may be used to specify a radius of the bounding circle. Numerous other variations will be apparent to those of skill in the art having the benefit of the disclosure herein.

In the structure 1400 of FIG. 14, following the conclusion of the term or object information, the structure 1400 may include chapter information for chapters 1454 of the digital work. Thus, each chapter 1454 may be identified by the name 1456 of the chapter, i.e., "CHAPTER 1" in this example, the start location 1458 of the chapter and the end location 1460 of the chapter. Accordingly, in the illustrated example, the structure 1400 includes three sections, namely a header section 1462, a terms or object information section 1464, and a chapters section 1466. Further, other types of supplemental information may be included in the structure 1400 in addition to examples described above. Accordingly, implementations herein are not limited to the particular example structure illustrated, and numerous other structures and formats will be apparent to those of skill in the art having the benefit of the disclosure herein.

Example Interface

Figure 15:
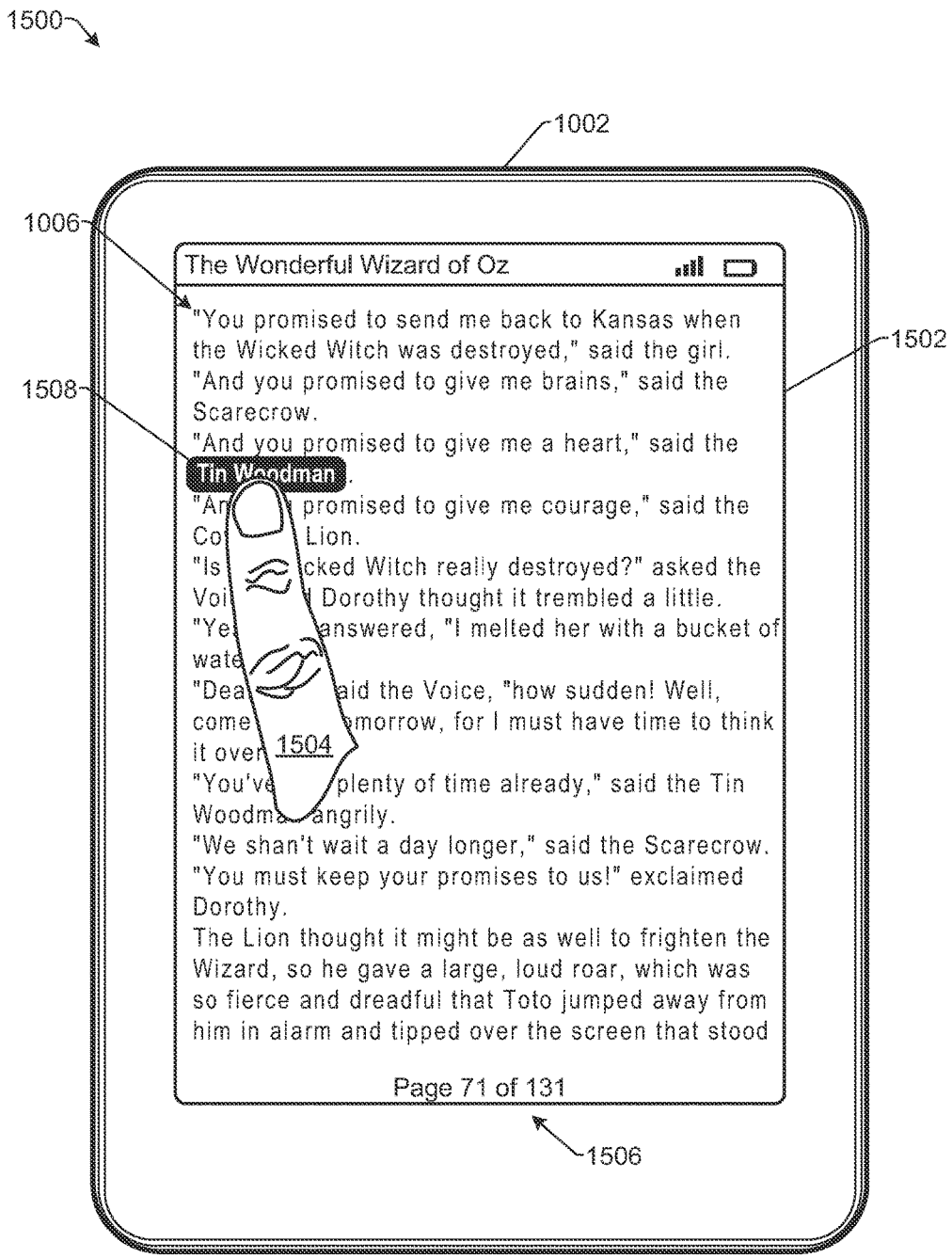
FIG. 15 illustrates an example device having an interface providing access to supplemental information according to some implementations.

FIG. 15 illustrates an example interface 1500 on the electronic device 1002 that enables selection of an object in a digital work 1006 according to some implementations. The device 1002 includes a display 1502 for displaying the digital work 1006 to a user. In some examples, the display 1502 may be a touchscreen type of display configured with a sensor to sense a touch input received from an input effector 1504, such as a finger of a user, a stylus, or other pointer. Thus, the touchscreen may receive one or more touch inputs, interactions, selections of displayed objects, page swipes and so forth. In other examples, the display 1502 may be non-touch sensitive. Accordingly, in addition to, or as an alternative to, a touch sensitive display, the electronic device 1002 may include various external controls and input devices (not shown in FIG. 15). For example, some implementations of the electronic device 1002 may include a virtual or physical keyboard, a mouse, a pointing stick, a touchpad, a trackball, a joystick, a remote control, buttons and/or various other controls for performing various desired inputs and interactions with the electronic device 1002 and digital work 1006 displayed on the display 1502. Additionally, in some implementations, one or more voice commands may be used to control or interact with the digital works and interfaces herein, such as for selection of objects and performing other functions. Thus, implementations herein are not limited to any type of input devices, techniques, or controls.

In the illustrated example of FIG. 15, suppose that the digital work 1006 that the user is reading is *The Wonderful Wizard of Oz* by L. Frank Baum, and that page 71 of the digital work is currently displayed on the display 1502 of the electronic device 1002, as indicated by the displayed page number 1506. Furthermore, suppose that the user desires to obtain more information regarding the Tin Woodman character of the digital work 1006. As illustrated in FIG. 15, the user may select an instance of the name of the Tin Woodman currently displayed on the electronic device 1002 as an object 1508. For example, in the case that the display 1502 includes a touch screen, the user may use the input effector 1504 (e.g., a finger) to select the name of the Tin Woodman. In other examples, the user may use other input controls, as described above, to select the object 1508, depending on the particular type and configuration of the electronic device 1002. For example, the user may employ a mouse, a pointing stick, a touchpad, a trackball, a joystick, a remote control, buttons and/or various other controls for selecting objects displayed in the digital work 1006 on the display 1502. Further, the objects that may be selected are not limited to words or phrases, but may include symbols, icons, images, figures, selectable areas of an image or video, and so forth. For example, in the case that the digital work 1006 is an image or video, examples of objects may include an image of a person or thing included in the image or video. Similarly, textual digital works may include symbols, maps, tables, images, and the like, that may also be objects that are selectable for viewing supplemental information according to some implementations herein.

Figure 16:
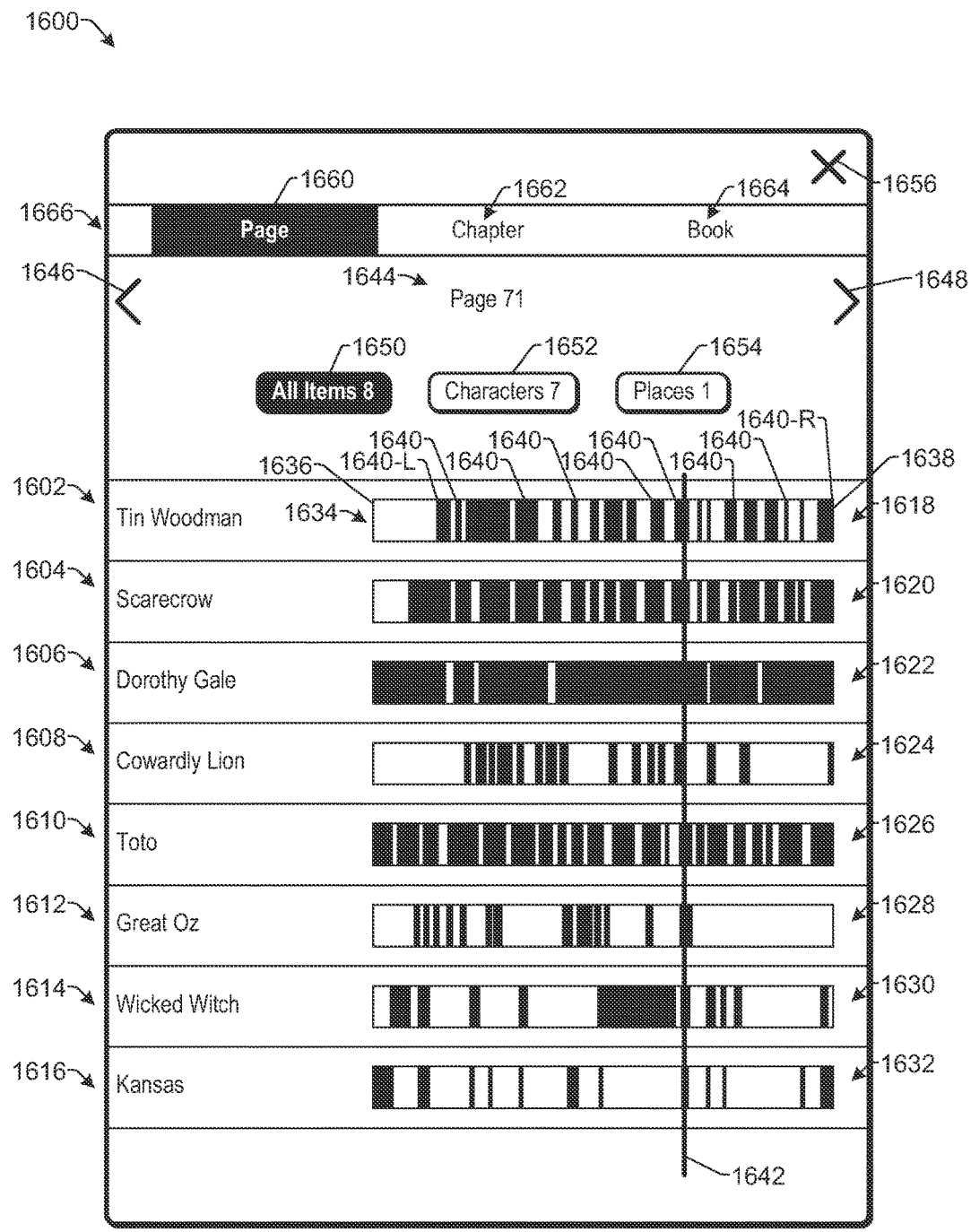
FIG. 16 illustrates an example interface providing supplemental information, depicting a page view user interface according to some implementations.

FIG. 16 illustrates an example of supplemental information displayed in a page view user interface 1600 according to some implementations herein. In this example, in response to user input received from the user in association with selection of the object 1508, the electronic device 1002 may display the user interface 1600 as a pop-up or overlay displayed overtop of the digital work 1006. In other implementations, the user interface 1600 may be displayed as a separate window or screen encompassing all or a portion of the display 1502. In yet other examples, the interface 1600 may be displayed in a split screen arrangement in which the user interface 1600 is displayed in a first portion of the display 1502 and the digital work continues to be displayed in a second portion of the display 1502, such as in a reduced size. Numerous other variations will also be apparent to those of skill in the art in view of the disclosure herein.

In this example, the user interface 1600 presents a plurality of objects identified on the particular page of the digital work 1006 at which the user selected the object 1508, as described above. For example, page 71 of the digital work 1006 identifies eight objects in total, including seven characters and one place. Accordingly, as mentioned above, the objects, such as characters, places, things, phrases of interest, events, popular highlights, and so forth, may be identified in a digital work in advance by the digital work provider. The digital work provider may then provide the supplemental information instance 1010, which includes the location and occurrence of each object identified in the digital work 1006, to the electronic device 1002 along with the digital work 1006.

In the illustrated example, the page view user interface 1600 displays the objects identified in page 71 of the digital work 1006. Accordingly, in this example, the user interface 1600 displays a listing 1602 for the Tin Woodman, a listing 1604 for the Scarecrow, a listing 1606 for Dorothy Gale, a listing 1608 for the Cowardly Lion, a listing 1610 for Toto, a listing 1612 for the Great Oz, a listing 1614 for the Wicked Witch, and a listing 1616 for Kansas. Associated with each item listing 1602-1616 is a visual representation that provides an indication of a location and frequency of each object in the digital work 1006. Thus, the interface 1600 provides a visual representation 1618, for the Tin Woodman, a visual representation 1620 for the Scarecrow, a visual representation 1622 for Dorothy, a visual representation 1624 for the Cowardly Lion, a visual representation 1626 for Toto, a visual representation 1628 for the Great Oz, a visual representation 1630 for the Wicked Witch, and a visual representation 1632 for Kansas.

In some examples, the objects displayed in the page view user interface 1600 may be displayed in an order in which the objects appear on the particular page from which the page view user interface 1600 is drawn. As another example, the listed objects in the page view user interface 1600 (and the other user interfaces described herein) may be displayed in an order of frequency of occurrence of each object in the digital work. For instance, the object occurring most frequently in the digital work may be listed first, and the other objects may be listed in a descending order of frequency. Further, when there are more objects listed than will fit on the view in the user interface, the listing may automatically scroll to display the selected object within the listing. As another example, the selected object may be listed first and the remaining objects may be displayed in the order of appearance on the page or an order of frequency. As some additional examples, the listed objects may be displayed in alphabetical order or according to a category or type of object. Numerous other variations will be apparent to those of skill in the art in light of the disclosure herein, with the foregoing merely being several examples. Further, the page view user interface 1600 and the other user interfaces described herein may include a control or button (not shown) for switching between various ordering arrangements for the objects. For example, the control may enable switching between ordering based on frequency, to ordering based on order of occurrence in the page or digital work, order based on type, or alphabetical ordering. As another example, the control may enable switching between displaying the most the frequently occurring objects listed first to displaying the least frequently occurring objects listed first, and so forth.

The visual representations 1618-1632 may represent both the location and frequency of occurrence of each corresponding object in the digital work 1006. For example, with respect to the visual representation 1618 for the Tin Woodman, the visual representation 1618 includes an area 1634 extending between a first side 1636 that is representative of a beginning of the digital work 1006 and a second side 1638 that is representative of an end of the digital work 1006. In this example, the area 1634 has a rectangular outline; however, other shapes and types of representations may also be used as discussed below. For example, in some implementations, the area 1634 may not have an outline or shape. The area 1634 extends from the first side 1636 to the second side 1638 and may be representative of the expanse (e.g., a total number of pages, a total runtime, a total number of locations, etc.) of the digital work that the visual representation 1618 symbolizes.

At least one vertical line, bar or other type of marking 1640 may be located in the area 1634. The marking 1640 may correspond to at least one referenced of the object in the digital work. Further, in some implementations, the location of the marking 1640 may generally correspond to a location of the occurrence of the object in the digital work itself. In the illustrated example, with respect to the visual representation 1618 for the object Tin Woodman, a plurality of markings 1640 are located within the area 1634 corresponding to a plurality of occurrences of the object Tin Woodman, or variations thereof, in the text of the digital work 1006. For example, a leftmost first marking 1640-L, closest to the first side 1636, represents the first occurrence of the object Tin Woodman in the digital work 1006. A rightmost second marking 1640-R, closest to the second side 1638, represents the location of the final occurrence of the object Tin Woodman in the digital work 1006.

The other markings 1640 located between the first marking 1640-L and the second marking 1640-R may represent other occurrences of the object Tin Woodman in the digital work 1006 at various locations corresponding to the locations of occurrences of the object Tin Woodman in the digital work. For example, for each page in the digital work on which the object Tin Woodman's name, or a variation thereof, appears, a marking 1640 may be applied to the visual representation 1618. Accordingly, in some implementations, if the resolution of the display 1502 permits, the visual representation 1618 may be generally to scale with a number of pages in the digital work 1006, with each marking 1640 representing at least one page in the digital work 1006 and being in a location corresponding to or proportional to the location of the page in the digital work out of a total number of the pages in the digital work. Thus, in some examples, occurrences of the object Tin Woodman on adjacent pages may appear as a single larger continuous marking 1640. Further, in some examples, a marking 1640 between the first side 1636 and the second side 1638 may be at a location that is proportional to a location of a page corresponding to the occurrence between the first page and the last page of the digital work.

Additionally, in some examples, such as in the case of a digital work that is a movie, song or television show, the digital work may have a total runtime, and the location of the marking in the visual representation may be proportional to an elapsed runtime of the occurrence out of a total runtime of the digital work. Further, in some examples, the digital work may have length analogous to a total text content, and the marking in the visual representation may correspond to a location of the occurrence of the object in the text content in relation to the total text content. In other examples, as described below, depending on the resolution of the display 1502, other types of markings may be used that may provide additional details, such as the number of occurrences of the object on each page of the digital work. Accordingly, numerous variations will be apparent to those of skill in the art in light of the disclosure herein.

Furthermore, in the example of FIG. 16, the page view user interface 1600 is rendered based on page numbers of the digital work 1006. In other implementations, however, rather than using page numbers, the page view user interface 1600 may be rendered based on location numbers determined for the digital work 1006. For instance, in some devices or platforms, a digital work is not displayed with page numbers or may not have page numbers associated therewith. As one example, because various different display conditions may exist during the rendering of a digital work on various different devices having various different display sizes and resolutions, page numbering may not apply to a digital work on some devices or platforms. In such a case, the digital work provider may use invariant referencing to assign location numbers to parts of the digital work. The location numbers may remain constant for the parts of the digital work regardless of a screen size, font type, font size or other variations in the display conditions of the digital work. Additional information on assigning location numbers to parts of a digital work is provided in U.S. Pat. No. 7,865,817 to Ryan et al., the entire disclosure of which is incorporated herein by reference. Still alternatively, the location numbering for the tokens described above with respect to FIGS. 12-13 may be employed as displayed location numbers.

Accordingly, in these implementations, rather than using page numbers, the digital work 1006 of FIGS. 10 and 15 may be displayed as one or more location numbers, such as a range of location numbers out of a total number of locations in the digital work 1006. Consequently, the interface 1600 may be generated based on the range of locations rendered on the display 1502 when the selection of the object 1508 is made. For example, suppose that the text of the digital work 1006 displayed in FIG. 15 corresponds to locations 1144-1155 out of a total 347 locations. Therefore, the listings 1602-1616 displayed in the user interface 1600 would correspond to the occurrence of the objects contained in locations 1144-1155 currently rendered on the display 1502.

Additionally, in the examples of digital works in which assigned locations are used instead of page numbers, the area 1634 of the visual representation 1618 may represent an expanse of the total locations in the digital work, from the first location on the first side 1636 to the last location on the second side 1638. Thus, the location of a marking 1640 in the visual representation may correspond to a location of the occurrence in the digital work and may be at a location between the first side 1636 and the second side 1638 that is proportional to a location of the occurrence in the digital work. For purposes of this description, regardless of whether page number or location identifiers are used, for ease of explanation a "page" will refer to the visible text that is displayed on the device and is not dependent upon a physical page size or font.

Referring again to FIG. 16, a vertical line 1642 may be displayed in the user interface 1600, traversing or passing through the visual representations 1618-1632, to indicate the location of the currently rendered page 71 (or equivalent location number range) with respect to the overall digital work 1006. Further, the current page number corresponding to the location of the vertical line 1642 and the displayed listings 1602-1616 is indicated at 1644. For example, the user may navigate the user interface 1600 to other pages in the digital work, such as by selecting a left arrow 1646 or a right arrow 1648 to move backwards or forwards in the digital work 1006, respectively. As one example, the user may tap the left arrow 1646 one time to move the user interface 1600 from the representation of objects on page 71 to a representation of objects on page 70 of the digital work 1006.

As the user navigates from one page to another, listings of various object may disappear or appear in the user interface 1600. For example, the object Kansas may not be mentioned on page 70 of the digital work 1006. Consequently, when the user navigates the user interface 1600 from a page view for page 71 to a page view for page 70, the listing 1616 and visual representation 1632 for the object Kansas may disappear while a listing and visual representation for one or more other objects referenced on page 70 may be added to the user interface 1600. In some instances, rather than just disappearing or being suddenly replaced, a fade effect may be applied such that the objects may fade in and out to enable the user to track which object are not present on particular pages. Additionally, in some examples, rather than tapping the left arrow 1646 or the right arrow 1648 to navigate to a page view for a different page, the user may select or otherwise drag the vertical line 1642 left or right to a different location with respect to the visual representations. The user can then view the user interface representation with respect to a different page, and the current page is identified by the page number indicator 1644.

In the illustrated example, the total number of different objects referenced on page 71 is indicated in an "all items" button 1650, which in this example indicates that there are a total of eight objects, which correspond to the eight listings 1602-1616. Further the number of character objects on page 71 is indicated in a characters button 1652 (i.e., seven in this example), while the number of place objects contained on page 71 is indicated in a places button 1654 (i.e., one in this example). In this example, the all items button 1650 is currently selected and, thus, all eight of the objects referenced on page 71 are displayed in the user interface 1600. On the other hand, if the user wanted to view just the character objects referenced on page 71, the user could select the characters button 1652 to display a listing of just the character objects in the user interface 1600 (i.e., listings 1602-1614). Similarly, if the user wanted to view just the place objects referenced on page 71, the user may select the places button 1654 and only the listing 1616 corresponding to the place objects (in this example Kansas) would be shown in the user interface 1600. Further, numerous other types of object buttons (e.g., phrases, things, organizations, etc.) may be displayed when those types of object are available on the particular page for which the supplemental information is being presented. However, when those types of object are not available on the page corresponding to the current page view interface 1600, then the object buttons for those object types may also not be displayed.

The techniques described above may be employed to navigate the page view interface 1600 to the presentation of a page view interface 1600 corresponding to a different page. When the user navigates the user interface 1600 to a different page, the corresponding different page from the digital work may be rendered on the display 1502 underneath the user interface 1600. Accordingly, the page of the digital work displayed on the display 1502 may change in correlation with the movement of the vertical line 1642 to various different pages in the digital work 1006. For example, suppose that the user wishes to move to the first occurrence at which the object Tin Woodman appears in the digital work 1006 to reread that portion of the digital work (e.g., page 37). The user may move the vertical line 1642 to the beginning of the leftmost marking 1640-L. Based on this movement of the vertical line 1642, the device may then change the page rendered on the display 1502 to correspond to the page at which the vertical line 1642 is currently located, i.e., page 37. The user may then close the user interface 1600, such as by tapping on a close-window control 1656 (e.g., an X in the upper right corner of the interface 1600). This action will close the user interface 1600 and present the user with the text of page 37 at which the object Tin Woodman is first mentioned in the digital work 1006. Accordingly, the user may employ the user interface 1600 to navigate through the digital work 1006 to locations of various objects of interest.

As mentioned above, the page view user interface 1600 displays a page view which displays the objects referenced on the currently rendered page. Accordingly, the user interface 1600 may indicate that the current view is the page view. Several examples of indicators include highlighting a word "page" 1660, outlining the word "page" 1660, bolding the word "page" 1660, enlarging the word "page" 1660, placing a marker or pointer under or above the word "page" 1660, or other suitable indicator may be provided to indicate that the current view is the page view. The user interface 1600 may also indicate that a chapter view and a book view are available for selection based on presentation of the word "chapter" 1662 and the word "book" 1664, as indicated in a header 1666 of the user interface 1600. For example, if the user desires to view the chapter view or the book view, the user may select the corresponding word "chapter" 1662 or "book" 1664 to switch to a chapter view user interface or book view user interface, respectively. Further, some digital works may not have "chapters." Consequently, for these digital works, the word "chapter" 1662 may not be present in the page view user interface 1600, but the option to navigate to the book view may remain.

Further in the case that the digital work is part of a series, a series view interface (not shown in FIG. 16) may be provided to navigate a series view interface. Location information for occurrences of objects in other digital works in the series may be included in the structure 1400 described above. Similarly, in some implementations, a library view interface (not shown in FIG. 16) may be available that shows all the occurrences of an object across an entire library of digital works. In some examples, the library of digital works used to generate the library view interface may be limited to the digital works contained on the electronic device 1002 (e.g., in a library of digital works stored on the electronic device 1002). In other examples, the library used to generate the library view interface may extend to some or all of the digital works maintained by the digital work provider (e.g., in a library of digital works of the digital work provider). In still other implementations, the library view may be selectable, providing a user with a view for digital works contained on the device or a view for all digital works maintained by the digital work provider.

FIG. 17 illustrates a supplemental information view user interface 1700 that the user may navigate to, such as from the user interface 1600 discussed above with respect to FIG. 16. For example, from the interface 1600, the user may select the object Tin Woodman, such as by tapping, double clicking, etc., and be presented with the supplemental information view user interface 1700. The supplemental information view user interface 1700 includes the name of the object 1702, and may include prestored content 1704 obtained in advance from an authoritative source and provided by the digital work provider as part of the supplemental information provided for the corresponding digital work 1006. Several examples of sources from which the prestored content may be obtained include online sources, such as Wikipedia®, Shelfari® and IMDb®, as well as other encyclopedias, reference books, websites, and the like, depending on the subject matter of the digital work being analyzed and supplemented.

Accordingly, the digital work provider may obtain a limited amount of information about the object 1702, such as an excerpt from an online source, to provide as prestored content 1704 with the supplemental information for a particular digital work. The digital work provider may also provide a link 1706 to the full article at an online source to enable the user to access additional information on the object 1702 if the user so desires and currently has network access. Accordingly, the user may view the full article on the object 1702 by selecting the link 1706 or the like. Additionally, the digital work provider 1004 may include a link 1708 to license information related to the prestored content 1704.

In other implementations, as an alternative to displaying the prestored content 1704, the supplemental information view interface 1700 may instead display one or more links to online sources of information about the selected object. In some examples, no prestored content 1704 is included with the supplemental information and instead the supplemental information may include one or more links or reference identifiers for sources of information or content about the selected object. For example, each displayed link may be selected by a user to access a network accessible resource that provides information about the selected object, such as descriptive text, an image, an audio clip, a video clip, and so forth. As another example, when the supplemental information view user interface 1700 is accessed, a module on the electronic device 1002 (e.g., a supplemental information display module, as described below) may access information from a network accessible resource to obtain and automatically display the information about the selected object in the supplemental information view user interface 1700. Thus, rather than relying on prestored content, the supplemental information view user interface 1700 may dynamically display content about the selected object retrieved from an online source. For example, the content may be retrieved from any of the online sources discussed above, from the digital work provider, or various other network accessible resources, either automatically or in response to a user selection of a displayed reference identifier (i.e., a link, a URL), or selection of a button or control that causes access to the network accessible resources. These implementations may reduce the frequency of updates to the prestored content since the latest content on information about the selected object will be obtained when the supplemental information view user interface 1700 is accessed. In some cases, however, updates to the reference identifiers that link to the network accessible resources may be still be made, such as when a URL changes, or if additional sources of information about the object become available.

Furthermore, the supplemental information view user interface 1700 may also provide the visual representation 1618 corresponding to the object 1702, and which may include a slider 1710 in a position that corresponds to text from one or more excerpts from the book listed below the visual representation 1618. For example, the supplemental information view user interface 1700 may provide the chapter 1712 and page number 1714 for each excerpt from the text of the digital work 1006. Accordingly, when the slider 1710 is positioned at the beginning of the visual representation 1618, such as at the leftmost marking, a first excerpt 1716 may include the first occurrence of the object Tin Woodman in the digital work, and may highlight the occurrence in the excerpt as indicated at 1718. Similarly, the second excerpt 1720 may include the second occurrence of the object Tin Woodman in the digital work and may highlight the occurrence in the excerpt, as indicated at 1722. Accordingly, the user may scroll down using the scroll down control 724 to view additional excerpts corresponding to the current location of the slider 1710. Further, the user may select and slide the slider left or right along the visual representation 1618 to view other excerpts from the book having occurrences of the object Tin Woodman therein. Furthermore, the user may select the left arrow 1646 to return to the previous user interface such as the page view user interface 1600 described above. Additional examples of user interfaces are described in U.S. patent application Ser. No. 13/246,759, filed Sep. 27, 2011, the entire disclosure of which is incorporated herein by reference.

Example Framework for Displaying Supplemental Information

Figure 18:
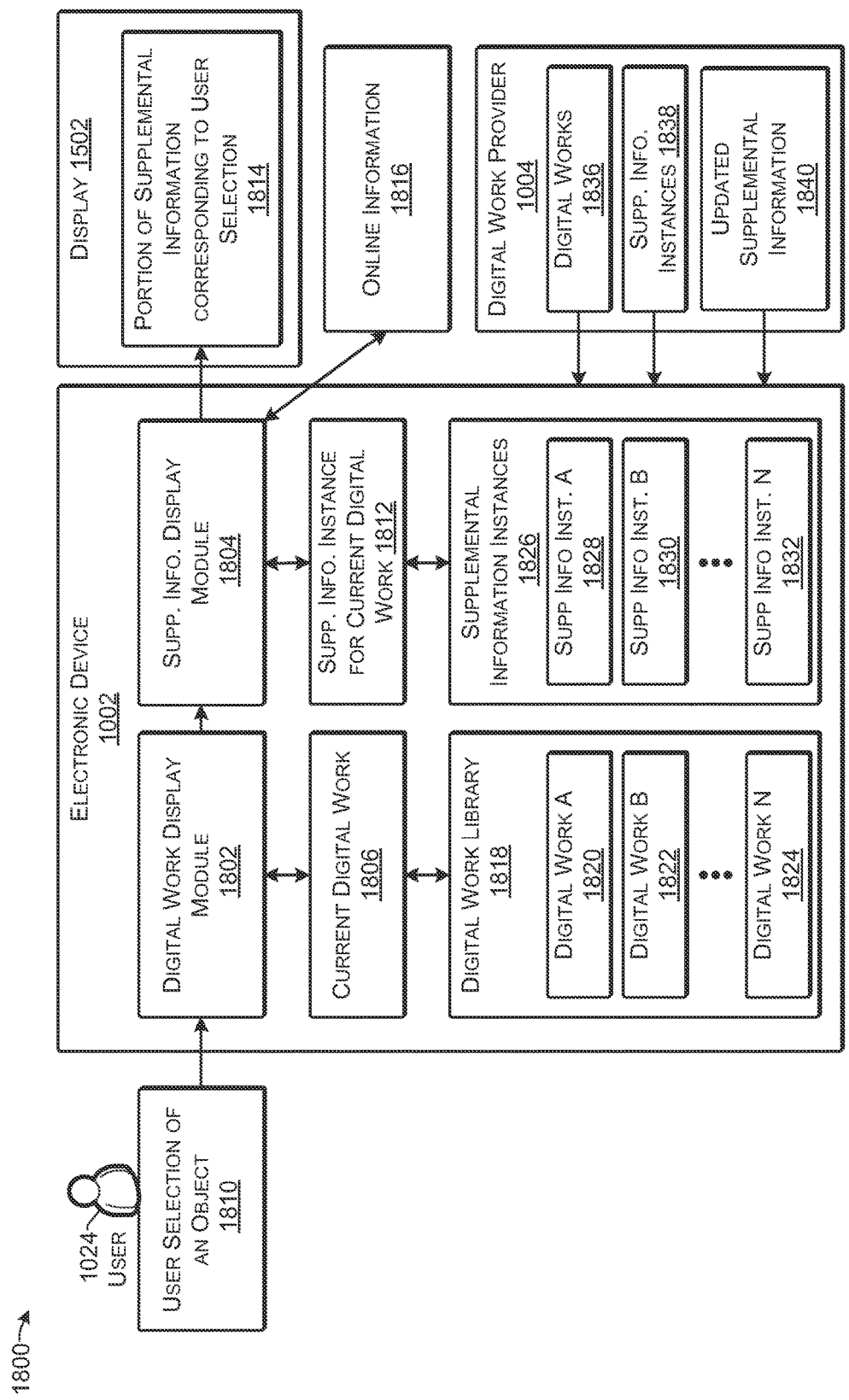
FIG. 18 illustrates an example framework for displaying supplemental information on an electronic device according to some implementations.

FIG. 18 illustrates an example framework 1800 for displaying supplemental information in connection with a digital work according to some implementations. In the example of FIG. 18, the electronic device 1002 includes a digital work display module 1802 and a supplemental information display module 1804. In some implementations, the digital work display module 1802 and the supplemental information display module 1804 may be separate modules. In other implementations, the digital work display module 1802 and the supplemental information display module 1804 may both be part of the same application or computer program for displaying content on the electronic device 1002. In yet other implementations, the digital work display module 1802 and the supplemental information display module 1804 may represent different functionalities of the same module.

As one example, the digital work display module 1802 may display a current digital work 1806 on the display 1502. In some examples, as mentioned above, the display 1502 may be part of the electronic device 1002, and/or unitary with the electronic device 1002. In other implementations, the display 1502 may be separate from the electronic device 1002 and connected to the electronic device 1002. In either case, the digital work display module 1802 may render the current digital work 1806 on the display 1502 for viewing by a user 1024.

As an example, while the digital work display module 1802 is displaying the current digital work 1806, the electronic device 1002 may receive a user selection 1810 of an object displayed in the current digital work 1806, as discussed above with reference to FIG. 15. In response, in some implementations, the supplemental information display module 1804 may be executed to provide a supplemental information instance 1812 in connection with the selected object of the current digital work 1806, such as described above with reference to the examples of FIGS. 15-17. The supplemental information instance 1812 may correspond to the supplemental information instance 1010 and structure 1400 described above. For example, the supplemental information display module 1804 may access the supplemental information instance 1812 available for the current digital work 1806, and may provide at least a portion 1814 of supplemental information corresponding to the user selection to be rendered on the display 1502, such as in a window, overlay, pop up, or other user interface or image displayed on the display 1502.

Additionally, in some implementations, the supplemental information display module 1804 may access online information 1816 when providing the portion 1814 of supplemental information. For example, if the user 1024 requests additional information with respect to prestored content, such as by clicking on a provided link, the supplemental information display module 1804 may retrieve the online information from a network location, such as a uniform resource locator (URL), or other network location or repository. Examples of sources of such online information 1816 include, but are not limited to Wikipedia®, Shelfari®, and IMDb®), as well as numerous other online sources. Additionally, in some implementations, the supplemental information display module 1804 may display links to online sources of information in place of or in addition to the prestored content. Further, in some instances, the supplemental information display module 1804 may dynamically obtain information about a selected object from one or more online sources of information or other network accessible resources in response to the user selection of the object.

In some examples, the electronic device 1002 may include a digital works library 1818, which may include one or more digital works, such as a digital work A 1820, a digital work B 1822, . . . , a digital work N 1824, and so forth. The electronic device 1002 may also include a supplemental information instances 1826, which may include supplemental information corresponding to the digital works in the digital work library 1818, and which may correspond to the supplemental information instance 1010 and structure 1400 described above. In some implementations, a separate instance of supplemental information may be provided for each digital work 1820-1824. Accordingly, supplemental information instance A 1828 may correspond to the digital work A 1820, supplemental information instance B 1830 may correspond to the digital work B 1822, . . . , supplemental information instance N 1832 may correspond to the digital work N 1824, and so on. For example, the supplemental information instance A 1828 may have been received by the electronic device 1002 in connection with the accessing or downloading of the digital work A 1820, such as from a digital work provider 1004. Thus, the digital work provider 1004 may provide digital works 1836 and corresponding supplemental information instances 1838 for each digital work 1836 to a plurality of electronic devices 1002 of a plurality of users 124.

Additionally, in some implementations, the digital work provider 1004 may provide the digital work and corresponding supplemental information to an intermediary, such as a wireless network provider (not shown) or the like, that, in turn, provides the digital work and corresponding supplemental information to particular electronic devices 1002. For purposes of this disclosure, "providing" by the digital work provider may include any intermediaries that perform delivery of the digital works and/or supplemental information.

In addition, the digital work provider 1004 may provide updated supplemental information 1840 to the electronic device 1002 on a one-time or periodic basis. For example, the supplemental information for one or more digital works stored on the electronic device 1002 may include prestored content that provides information on one or more objects in the digital work. Such prestored content may be updated at the original source, and thus, the digital work provider may provide updated supplemental information 1840 to the electronic device 1002 to reflect the change or update at the original source. Furthermore, other portions of the supplemental information may also change over time. For example, as new digital works are produced, objects in previous digital works may be discussed, used or referenced in the new digital works. Thus, in some examples, the supplemental information for existing digital works may be updated to include references to, or instances of, objects in newer digital works, such as for presenting the library view described above. Various other types of updates to the supplemental information may be provided by the digital work provider, with the foregoing being just several examples. In addition, in some implementations, the supplemental information display module 1804 on the electronic device 1002 may independently seek out and obtain updates to the supplemental information, such as from the digital work provider and/or other online sources.

To control the frequency of updates to the supplemental information, the digital work provider may apply one or more policies to determine whether changes to the prestored content, the reference identifiers, or other supplemental information are significant enough to warrant the distribution of updated supplemental content. For example, with respect to the prestored content, the digital work provider 1004 may determine whether the content has been changed by a predetermined threshold amount. The digital work provider 1004 may also consider other factors associated with the prestored content and the source of the prestored content, such as whether the source of the prestored content indicates that an error in the content has been corrected. Further, with respect to other types of updates to the supplemental information, various thresholds or policies may be similarly applied to determine whether to provide an update to the supplemental information for a particular digital work.

Additionally, in some implementations, crowd sourcing may be used to assist in correcting errors in alternate names, locations of objects in a digital work, and other automated decisions. For example, users may be provided the opportunity to correct or augment the supplemental information. In some instances, the author of the digital work may also be provided the opportunity to provide information regarding alternate names and other information, such as selection of significant phrases, locations of occurrences of particular objects, identification of scenes, and the like, depending on the nature of the digital work.

Example System Architecture

Figure 19:
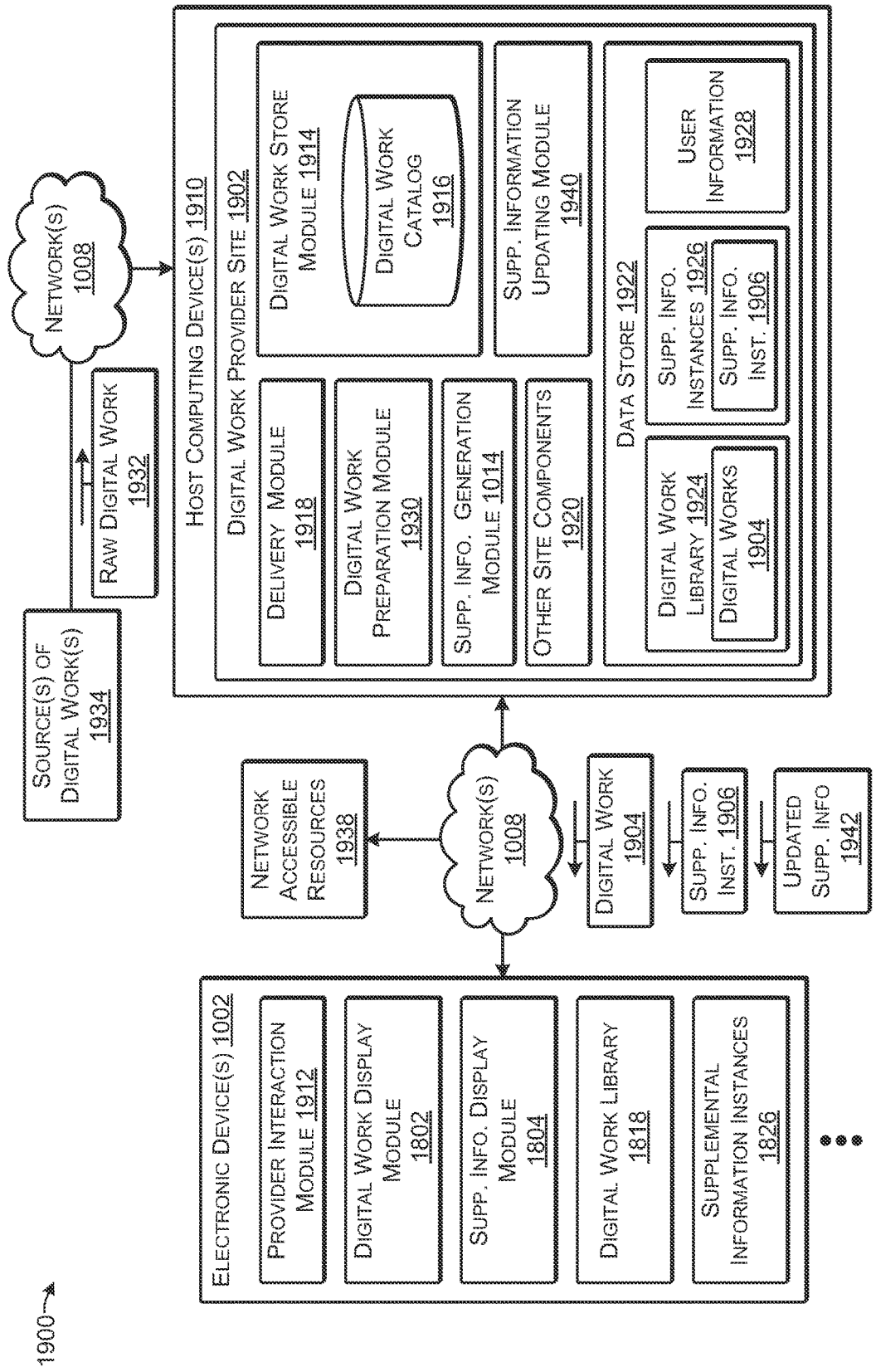
FIG. 19 illustrates an example architecture of a system for providing supplemental information for a digital work according to some implementations.

FIG. 19 illustrates an example architecture of a system 1900 including a digital work provider site 1902 for providing one or more digital works 1904 and corresponding supplemental information instance 1906 to one or more electronic devices 1002 according to some implementations. As one example, the digital work provider site 1902 may be a merchant website, an e-commerce site, or the like, that offers digital works to the public. In some implementations, the digital work provider site 1902 may offer digital works 1904, such as books, magazines, newspapers, songs, movies, and so forth, to the public through a website, other type of electronic commerce site, an online location, or the like. In some examples, the digital work provider site 1902 may alternatively, or additionally, provide digital works through an online or mobile application executing on the electronic device 1002. For example, an application on the electronic device 1002 may connect to or obtain content from the digital work provider site 1902 to enable the purchase or management of digital works, and the like. Thus, the digital work provider site 1902 may enable an electronic device 1002 to access digital works 1904 through an online or mobile application executing on a mobile device, such as an eBook reader, smart phone, tablet computing device, or the like. Accordingly, the digital work provider site 1902 is not limited to a website accessed by a browser, but may encompass other technologies for obtaining digital works, such as through in-application shopping, and the like.

The digital work provider site 1902 is able to communicate with one or more electronic devices 1002 and one or more users 124 through one or more networks 1008. For example, the network(s) 1008 may include a local area network (LAN), a wide area network (WAN), such as the Internet, or any combination thereof, and may include both wired and wireless communication technologies using any suitable protocols and communication techniques. The digital work provider site 1902 and the electronic device 1002 may communicate and interact with one another using any combination of suitable communication and networking protocols, such as Internet protocol (IP), transmission control protocol (TCP), hypertext transfer protocol (HTTP), and so forth.

In some implementations, the digital work provider site 1902 may be hosted on one or more host computing devices 1910. As one example, the host computing device(s) 1910 may be one or more web servers located at a data center, server farm, or other single physical location. In other examples, the digital work provider site 1902 or portions thereof may be located in diverse locations that are physically remote from one another. Further, in some implementations, the digital work provider site 1902 may be a group of websites, data stores, services, and the like, hosted on a plurality of different host computing devices 1910 in a plurality of diverse locations, or hosted by one or more host computing devices 1910 at a single location.

In the illustrated example, the electronic device 1002 may include the digital work display module 1802, the supplemental information display module 1804, the digital work library 1818, and the supplemental information instances 1826, as discussed above with reference to FIG. 18. The electronic device 1002 may further include a provider interaction module 1912, which in some instances may be an application, such as a web browser, mobile application, or other module or computer program configured to receive web content, webviews, online content, or the like, for accessing and interacting with the digital work provider site 1902. For example, the provider interaction module 1912 may enable the user 1024 to shop for digital works at the digital work provider site 1902 and access or receive digital works 1904 from the digital work provider site 1902, such as by downloading through the network(s) 1008. Further, in some implementations, the provider interaction module 1912 may enable the user 1024 to organize or manage the digital works on the electronic device 1002, while in other implementations, a separate management module (not shown) may provide this functionality.

The digital work provider site 1902 may include a digital work store module 1914 that may provide or may access a digital work catalog 1916. For example, the digital work store module 1914 may present the digital work catalog 1916 to an electronic device 1002 that accesses the digital work provider site 1902 to shop for a digital work 1904. The digital work catalog 1916 may include searchable and/or browsable listings and descriptions of digital works 1904 available from the digital work provider site 1902. The digital work store module 1914 may communicate with the provider interaction module 1912 on the electronic device 1002 to enable the user 1024 to locate and acquire a digital work from the digital work provider site 1902.

The digital work provider site 1902 may further include a delivery module 1918 that may deliver a digital work to the electronic device 1002 and/or the user 1024. For example, in some instances, the delivery module 1918 may facilitate the download of a digital work to the electronic device 1002 over the network(s) 1008. In other instances, the delivery module 1918 may provide for delivery of a hard copy of the digital work to the user, such as by delivery of a recording medium that maintains a copy of the digital work, depending on the nature of the digital work and the electronic device 1002.

Furthermore, in some implementations, the delivery module 1918 may refer to the user information 1928 to determine one or more digital works 1904 to download to the electronic device 1002. For example, a user 1024 may have purchased or otherwise accessed digital works 1904 from the digital work provider site 1902 in the past. The user 1024 may acquire a new electronic device 1002 and desire to have the previously purchased digital works 1904 accessible on the new electronic device 1002. Consequently, the delivery module 1918 may deliver the previously purchased digital works 1904 to the new electronic device 1002 and, contemporaneously, may also deliver the supplemental information instance 1906 corresponding to each of the digital works 1904 delivered to the new electronic device 1002, such as before, during or after delivery of the previously purchased digital works 1904. For example, the user information 1928 may include account information, a purchase history, a user library, or other records of digital works of the user 1024, such as with respect to a first electronic device 1002. Subsequently, when the user 1024 acquires a second electronic device 1002, the delivery module 1918 may refer to the user information 1928 to determine, at least in part, digital works and related supplemental information to download to the second electronic device 1002.

The digital work provider site 1902 may also include various other site components 1920, as is known, depending on the design and intended use of the digital work provider site 1902. For example, the other site components 1920 may include one or more pages of content, such as webpages, webviews, or other online content, that may be presented to the user 1024 through the provider interaction module 1912, such as during shopping for digital works from the digital work provider site 1902.

The digital work provider site 1902 may include or may access one or more data stores 1922 that include a digital work library 1924, supplemental information instances 1926, and user information 1928. For example, the digital work library 1924 may include a plurality of digital works 1904 that the digital work provider has available for access by the user 1024, such as by purchase through the digital works catalog 1916. The supplemental information instances 1926 may include a supplemental information instance 1906 for at least some of the digital works 1904 in the digital work library 1924. For example, the digital work provider site may generate the supplemental information instance 1906 for the digital works 1904 in the digital work library 1924 to provide the interfaces and information described above with reference to FIGS. 16-17. Further, the user information 1928 may include information for a plurality of users 124 of the digital work provider site 1902. For example, the user information 1928 may include account information for each user for identifying and interacting with the user, such as name, email address, mailing address, telephone number, user identification (ID) number, user purchase history (e.g., digital works acquired by the user) so forth.

The digital work provider site 1902 may also include a digital work preparation module 1930 that may receive raw digital works 1932 from one or more sources of digital works 1934. For example, the sources of digital works 1934 may be publishers, authors, movie distributors, studios, music companies, artists, and so forth. In the case of textual digital works, the digital work preparation module 1930 may receive a raw digital work 1932 from the publisher, author, or other source of digital works 1934, and may parse and process the raw digital work 1932 to make the digital work compatible with various display formats, device platforms, and so forth. For example, the digital work preparation module 1930 may identify the start location and end location of pages, paragraphs, sentences, and other information in the digital work, and may produce metadata for the digital work that identifies the digital work and the properties of the digital work to enable rendering of the digital work on an electronic device 1002.

The digital work provider site 1902 may further include a supplemental information generation module 1014, which may operate on the digital works 1904 in the digital works library 1924 to produce the supplemental information instance 1906. For example, the supplemental information generation module 1014 may select a particular digital work 1904 from the digital work library 1924 for generating supplemental information instance 1906 for the particular digital work 1904. The supplemental information generation module 1014 may parse and index the digital work by identifying characters, people, things, phrases, places and so forth that are of significance in the digital work. In some examples, the supplemental information generation module 1014 may access various authoritative sources of information, as well as performing statistical analysis and modeling to identify the significant objects in the particular digital work 1904. Thus, during the parsing, the supplemental information generation module 1014 may identify candidate objects that are candidates to make into objects for the digital work, such as by identifying proper names, place names, statistically improbable phrases, and the like, in the text of the digital work. For instance, a statistically improbable phrase is a word or combination of words that occur in the text of a digital work one or more times in a manner that is out of a predetermined threshold. For example, if a particular phrase is used multiple times in a digital work, while not being used or being used rarely in other digital works, this may be a statistically improbable phrase that is a candidate to become an object of the digital work.

To determine which candidate objects to make into objects, the supplemental information generation module 1014 may access other sources of information outside the digital work. For example, the supplemental information generation module 1014 may access network accessible resources 1938 that may include online sources of information, such as Wikipedia®, Shelfari® and IMDb®, online dictionaries, or other online resources, to determine identification of characters and other significant phrases, things, events or places in a digital work 1904. Further, the supplemental information generation module 1014 may obtain additional information on the statistically improbable phrases in the particular digital work 1904, such as by obtaining definitions or other information for these phrases from various locations, such as the authoritative sources mentioned above.

Following identification of the objects in the digital work, the supplemental information generation module 1014 may identify or obtain, where available, excerpts with respect to identified objects in the particular digital work from the authoritative sources. For example, the supplemental information generation module 1014 may obtain content on an object, such as an excerpt from a Wikipedia article, a Shelfari or IMDb listing, or the like, to include with the supplemental information instance 1906 as prestored content for the objects identified in the particular digital work 1904. In other examples, the supplemental information generation module 1014 identifies the location of the content containing information about the object and includes a reference identifier to a network location of the content, rather than the content itself, with the with supplemental information.

The supplemental information instance 1906 generated for each digital work may be stored in the supplemental information instances 1926. When the user 1024 acquires a particular digital work 1904, such as through interaction with the digital work store module 1914, the delivery module 1918 may deliver the particular digital work 1904 to the electronic device 1002, and may also deliver the corresponding supplemental information instance 1906 for the particular digital work. For example, the particular digital work 1904 and the corresponding supplemental information instance 1906 may be downloaded contemporaneously from the digital work provider site 1902, e.g., as a package or as a sequential download.

Further, as mentioned above with respect to FIG. 18, updated supplemental information may also be provided for delivery to the electronic device 1002 for the digital works stored on the electronic device 1002, such as during one-time updates or at regular interval updates. The digital work provider site 1902 may include a supplemental information updating module 1940 that checks for updates to the supplemental information instance 1906. For example, the supplemental information updating module 1940 may check for updates to the digital work library 1924 that may necessitate updating a supplemental information index, such as to expand a library view of particular objects to include newly added digital works. Further, the supplemental information updating module 1940 may check for changes to prestored content in the supplemental information instance 1906 and/or may determine that links or network locations for new sources of information about objects in the supplemental information are available. For example, the supplemental information updating module 1940 may update the supplemental information instance 1906 for a digital work to include updated prestored content, new prestored content, or new or different reference identifiers to online sources of information about an object. Further, as mentioned above with reference to FIG. 18, the supplemental information updating module 1940 may apply one or more policies, thresholds, or the like, to determine whether the changes to the prestored content, reference identifiers, or other supplemental information are significant enough to warrant the distribution of updated content.

When supplemental information instance 1906 for a particular digital work 1904 is updated an amount significant enough to merit distribution of updated supplemental information, the supplemental information updating module 1940 may use user information 1928 to determine one or more electronic devices 1002 that have an older version of the supplemental information. The supplemental information updating module 1940 may make updated supplemental information 1942 available for delivery to the one or more electronic devices 1002 to update the supplemental information on those electronic devices 1002. The delivery module 1918 may deliver the updated supplemental information 1942, or may provide the updated supplemental information 1942 to an intermediary that performs the delivery.

Example Electronic Device

Figure 20:
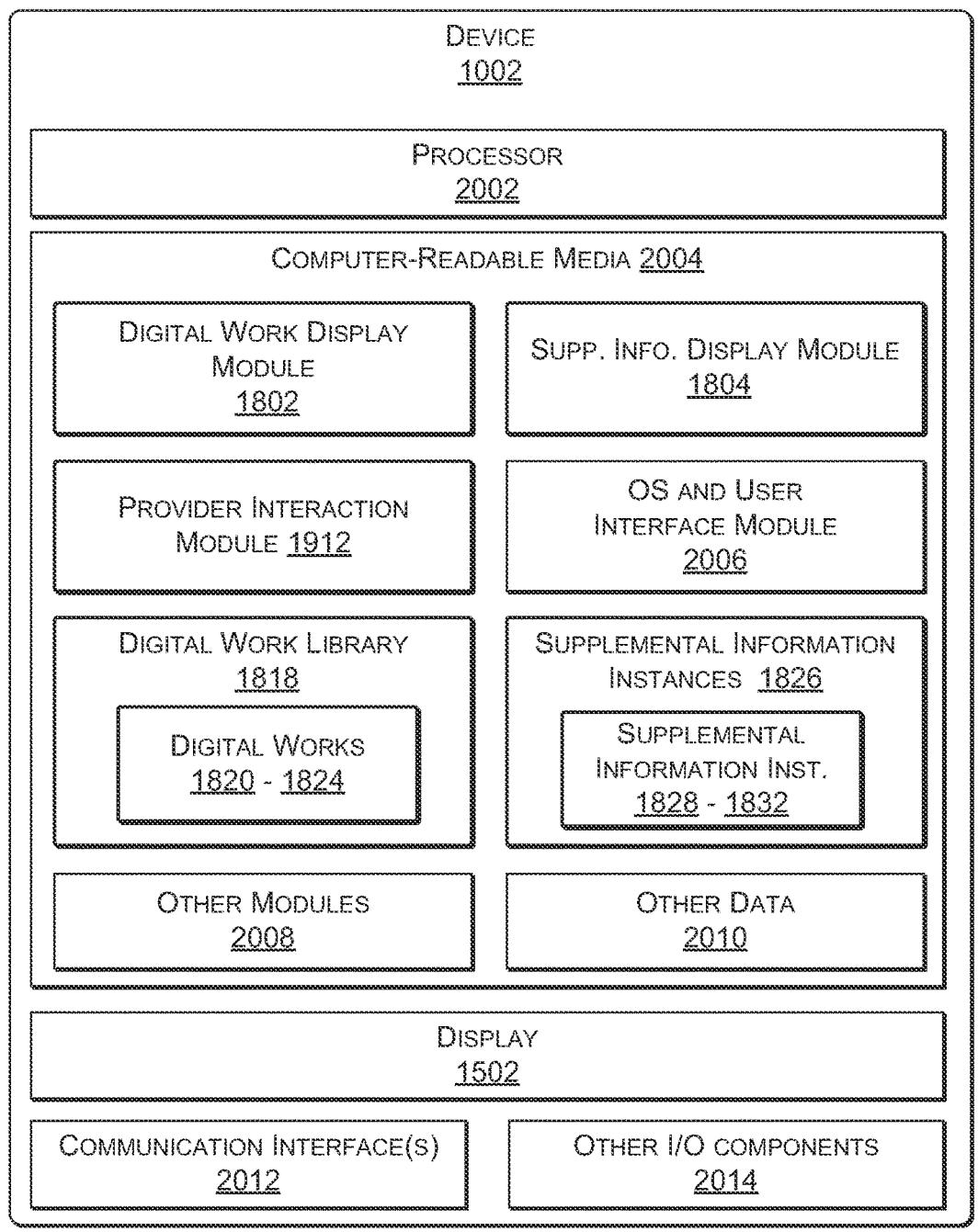
FIG. 20 illustrates select components of an example electronic device according to some implementations.

FIG. 20 illustrates select example components of the electronic device 1002 that may be used to implement the functionality described above according to some implementations. In a very basic configuration, the electronic device 1002 includes, or accesses, components such as at least one processor 2002 and a computer-readable media 2004. Each processor 2002 may itself comprise one or more processors or cores. Depending on the configuration of the electronic device 1002, the computer-readable media 2004 may be an example of non-transitory computer storage media and may include volatile and nonvolatile memory and/or removable and non-removable media implemented in any type of technology for storage of information such as computer-readable instructions, data structures, program modules or other data. Such computer-readable media includes, but is not limited to, RAM, ROM, EEPROM, flash memory or other computer-readable media technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store information and which can be accessed by the processor 2002 directly or through another computing device. Accordingly, the computer-readable media 2004 may be computer-readable media able to maintain instructions, modules or components executable by the processor 2002.

The computer-readable media 2004 may be used to store any number of functional components that are executable by the processor 2002. In some implementations, these functional components comprise instructions or programs that are executable by the processor 2002 and that, when executed, implement operational logic for performing the actions attributed above to the electronic device 1002. Functional components of the electronic device 1002 stored in the computer-readable media 2004 may include the digital work display module 1802 and the supplemental information display module 1804, as described above, which may be executed on the processor 2002 for displaying the digital works 1820-1824 and supplemental information instances 1828-1832 for the digital works 1820-1824, respectively. Additional functional components stored in the computer-readable media 2004 may include the provider interaction module 1912, executable by the processor 2002 for obtaining the digital works 1820-1824 and the corresponding supplemental information instances 1828-1832 from the digital work provider site 1902. Other functional components may include an operating system and user interface module 2006 for controlling and managing various functions of the electronic device 1002. Depending on the type of the electronic device 1002, the computer-readable media 2004 may also optionally include other functional components, such as other modules 2010, which may include applications, programs, drivers and so forth.

The computer-readable media 2004 may also store data, data structures, and the like that are used by the functional components. For example, data stored by the computer-readable media 2004 may include the digital work library 1818, containing the digital works 1820-1824, and the supplemental information instances 1826, containing the supplemental information instances 1828-1832. The electronic device 1002 may also include other data 2010, which may include, for example, data used by the provider interaction module 1912, the operating system and user interface 2006, and the other modules 2008. Further, the electronic device 1002 may include many other logical, programmatic and physical components, of which those described are merely examples that are related to the discussion herein.

FIG. 20 further illustrates the display 1502, which may be passive, emissive or any other form of display. In one implementation, the display uses electronic paper (ePaper) display technology, which is bi-stable, meaning that it is capable of holding text or other rendered images even when very little or no power is supplied to the display. Some examples of suitable ePaper displays that may be used with the implementations described herein include bi-stable LCDs, MEMS, cholesteric, pigmented electrophoretic, and others. In other implementations, or for other types of devices, the display 1502 may be an active display such as a liquid crystal display, plasma display, light emitting diode display, organic light emitting diode display, and so forth. These displays may comprise drive electronics, such as a display drive matrix configured to affect individual pixels within the display 1502. Additionally, in some implementations, the display 1502 may be a 3D display capable of providing a 3D image. For example, the display 1502 may produce a 3D image by providing alternating left-eye and right-eye images with or without the use of shuttering or filtering eyeglasses. Accordingly, in some implementations, the visual representations and other user interface components herein may be rendered in 3D.

One or more communication interfaces 2012 may support both wired and wireless connection to various networks, such as cellular networks, radio, WiFi networks, short-range or near-field networks (e.g., Bluetooth®), infrared signals, local area networks, wide area networks, the Internet, and so forth. For example, the communication interface 2012 may allow a user of the electronic device 1002 to access the World Wide Web, download digital works and supplemental information from the digital work provider site 1902, access supplemental online content, such as from a website or other network location, and the like. The communication interface 2012 may further allow a user to access storage on another device, such as a user's computing device, a network attached storage device, or the like.

The electronic device 1002 may further be equipped with various other input/output (I/O) components 2014. Such I/O components may include a touchscreen and various user actuatable controls (e.g., buttons, a joystick, a keyboard, a mouse, etc.), speakers, a microphone, a camera, connection ports, and so forth. For example, the operating system 2006 of the electronic device 1002 may include suitable drivers configured to accept input from a keypad, keyboard, or other user actuatable controls and devices included as the I/O components 2014. For instance, the user actuatable controls may include page turning buttons, navigational keys, a power on/off button, selection keys, and so on. Additionally, the electronic device 1002 may include various other components that are not shown, examples of which include removable storage, a power source, such as a battery and power control unit, a global positioning system (GPS) device, a PC Card component, and so forth.

Example Computing Devices

Figure 21:
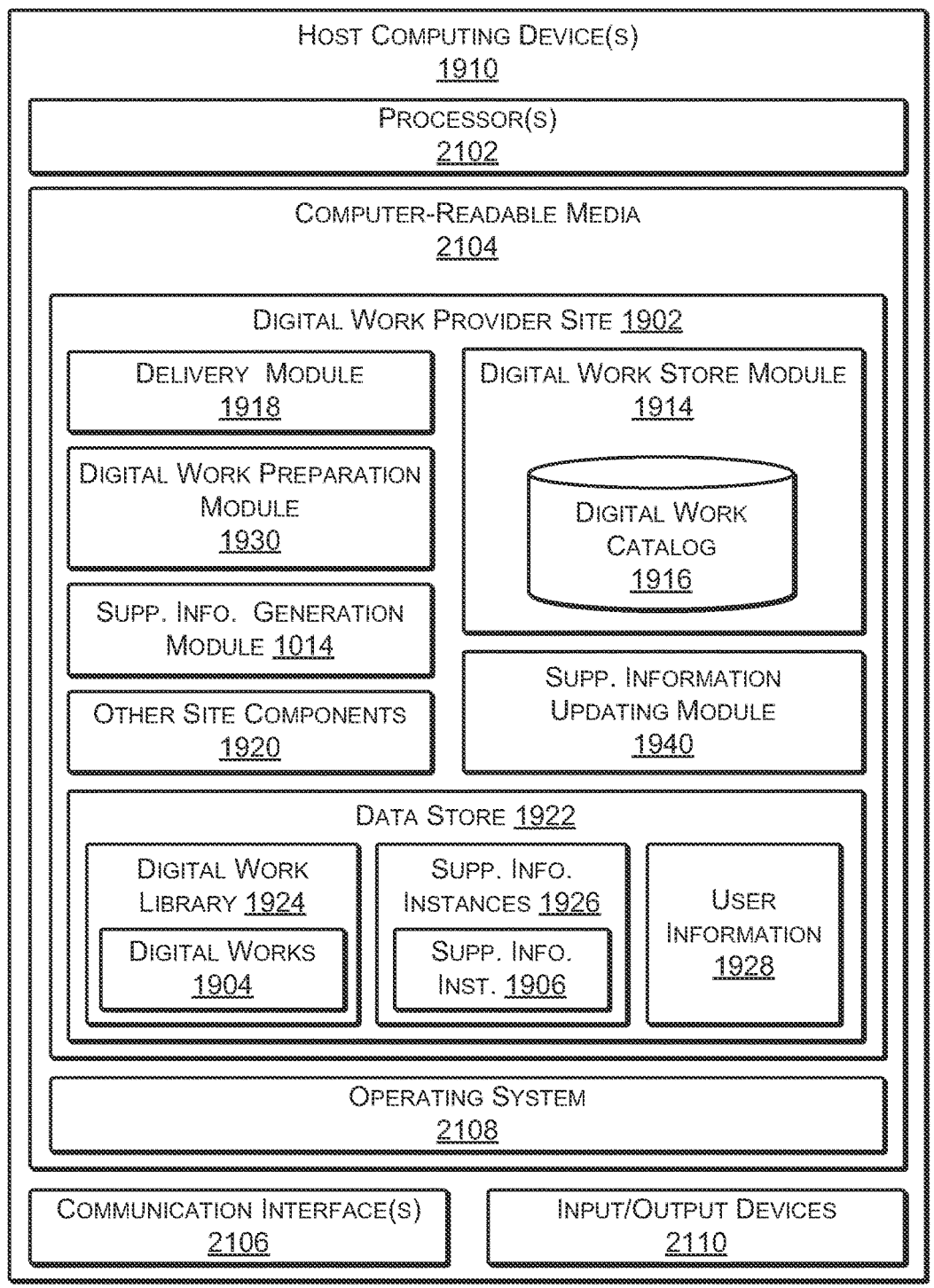
FIG. 21 illustrates select components of one or more example host computing devices of a digital work provider according to some implementations.

FIG. 21 illustrates select components of one or more host computing devices 1910 that may be used to implement the functionality of the digital work provider site 1902 according to some implementations. The digital work provider site 1902 may be hosted on one or more servers or other types of computing devices that may be embodied in any number of ways. For instance, in the case of a server, the digital work provider site 1902 may be implemented on a single server, a cluster of servers, a server farm or data center, a cloud hosted computing service, and so forth, although other computer architectures (e.g., a mainframe architecture) may also be used. Further, while the figures illustrate the components of the digital work provider site 1902 as being present in a single location, it is to be appreciated that these components may be distributed across different computing devices and locations in any manner. Generally, the digital work provider site 1902 may be implemented by one or more computing devices, with the various functionality described above distributed in various ways across the different computing devices. The computing devices may be located together or separately, and organized, for example, as virtual servers, server banks and/or server farms. The described functionality may be provided by the servers of a single entity or enterprise, or may be provided by the servers and/or services of multiple entities or enterprises.

As illustrated in FIG. 21, an example host computing device 1910 includes one or more processors 2102, a computer-readable media 2104, and one or more communication interfaces 2106. The processor(s) 2102 may be a single processing unit or a number of processing units, and may include single or multiple computing units or multiple cores. The processor(s) 2102 can be configured to fetch and execute computer-readable instructions stored in the computer-readable media 2104 or other computer-readable media.

The computer-readable media 2104 may include volatile and nonvolatile memory and/or removable and non-removable media implemented in any type of technology for storage of information, such as computer-readable instructions, data structures, program modules or other data. Such computer-readable media includes, but is not limited to, RAM, ROM, EEPROM, flash memory or other memory technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store the desired information and that can be accessed by a computing device. Depending on the configuration of the computing device 1910, the computer-readable media 2104 may be a type of computer-readable storage media and may be a non-transitory storage media.

The computer-readable media 2104 may be used to store any number of functional components that are executable by the processors 2102. In many implementations, these functional components comprise instructions or programs that are executable by the processors 2102 and that, when executed, implement operational logic for performing the actions attributed above to the digital work provider site 1902. Functional components of the digital work provider site 1902 that may be executed on the processors 2102 for implementing the various functions and features related to providing digital works and supplemental information, as described herein, include the digital work store module 1914, the delivery module 1918, the digital work preparation module 1930, the supplemental information generation module 1014, and the supplemental information updating module 1940. Additional functional components stored in the computer-readable media 2104 may include the other site components 1920, and an operating system 2108 for controlling and managing various functions of the host computing device(s) 1910. In addition, the computer-readable media 2104 may include, or the host computing device(s) 1910 may access, the data store(s) 1922, which may include the digital work library 1924, including the digital works 1904, the supplemental information instances 1926, including the supplemental information instance 1906, and the user information 1928. In addition, the computer-readable media 2104 may store or the host computing devices(s) 1910 may access the digital work catalog 1916 used by the digital work store module 1914. The host computing device(s) 1910 may also include many other logical, programmatic and physical components, of which those described above are merely examples that are related to the discussion herein.

The communication interface(s) 2106 may include one or more interfaces and hardware components for enabling communication with various other devices, such as the electronic devices 1002, over the network(s) 1008. For example, communication interface(s) 2106 may facilitate communication through one or more of the Internet, cable networks, cellular networks, wireless networks (e.g., Wi-Fi, cellular) and wired networks. Various different approaches to implementations described herein can be implemented in various environments. For instance, the network(s) 1008 may include any appropriate network, including an intranet, the Internet, a cellular network, a LAN, WAN, VPN or any other network or combination thereof. Components used for such a system can depend at least in part upon the type of network and/or environment selected. Protocols and components for communicating via such networks are well known and will not be discussed herein in detail.

Host computing device(s) 1910 may further be equipped with various input/output devices 2110. Such I/O devices 2110 may include a display, various user interface controls (e.g., buttons, mouse, keyboard, touch screen, etc.), audio speakers, connection ports and so forth.

Various instructions, methods and techniques described herein may be considered in the general context of computer-executable instructions, such as program modules stored on computer storage media and executed by the processors herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation. Additionally, the example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, implementations herein are not limited to the particular examples shown and discussed.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The invention claimed is:

1. One or more non-transitory computer-readable media maintaining instructions executable by one or more processors to perform operations comprising:
   extracting text from a digital work;
   identifying a plurality of names from the text extracted from the digital work, wherein location information is associated with each name, the location information including a location within the digital work of each occurrence of each name;
   sorting the plurality of names in a sorted list by ordering the names based, at least in part, on a fullness of each of the names relative to other names in the sorted list, the fullness indicating an amount of information contained in each name;
   generating a first name set and a second name set from the sorted list of names;
   determining that a first name is present in the first name set and the second name set;
   determining a proximity of a particular occurrence of the first name to an occurrence of a second name based on the location information;
   identifying whether the particular occurrence of the first name belongs to the first name set or the second name set based, at least in part, on the proximity;
   generating a digital supplemental information file comprising a visual representation of locations within the digital work where at least one name of the plurality of names in the first name set occur, wherein the visual representation comprises an object with markings, each of the markings corresponding to a respective occurrence;
   receiving, from an electronic device, a request for the digital supplemental information file; and
   sending the digital supplemental information file to the electronic device, the digital supplemental information file altering functionality of the digital work to include at least one selectable portion that enables display of the visual representation of the locations within the digital work.

2. The one or more non-transitory computer-readable media as recited in claim 1, wherein generating the first name set and the second name set comprises:

determining that a particular name from the sorted list corresponds to at least one other name in at least one of the first name set or the second name set;

adding the particular name from the sorted list to at least one of the first name set or the second name set.

3. The one or more non-transitory computer-readable media as recited in claim 2, wherein the particular name from the sorted list corresponds to at least one name in the first name set or the second name set when at least the particular name from the sorted list is an alternate name of the at least one name in the first name set or the second name set based, at least in part, on external information obtained from a source external to the digital work.

4. The one or more non-transitory computer-readable media as recited in claim 1, further comprising:
   determining that the first name set or second name set includes multiple names; and
   selecting a representative name from the first name set or the second name set to represent an entity corresponding to the first name set or the second name set comprises selecting the representative name from the particular name set based, at least in part, on at least one of:
      a presence of a suffix in the representative name; or
      a fullness of the representative name as including one or more of: a title, a first name, a middle name, or a last name, in comparison with other names in the first name set or the second name set.

5. The one or more non-transitory computer-readable media as recited in claim 1, further comprising determining a representative name from each of the first name set and the second name set to represent an entity corresponding to each of the first name set and the second name set, wherein the entity is one or more of:
   a character in the digital work;
   a person mentioned in the digital work;
   a place mentioned in the digital work; or
   an organization mentioned in the digital work.

6. The one or more non-transitory computer-readable media as recited in claim 1, wherein the fullness of the second name is greater than the first name.

7. A method comprising:
   under control of one or more processors configured with executable instructions,
      obtaining, by one or more computing devices, names from a digital work;
      generating a digital supplemental information file comprising one or more name sets relating to the names, each name set corresponding to a different entity in the digital work, each name set including at least one name for the respective entity corresponding to the name set, and at least one name set including multiple different names in the name set for the respective entity corresponding to that name set, wherein the one or more name sets are generated by at least:
         sorting the names in the one or more name sets into a sorted list;
         obtaining information from a source external to the digital work, the information indicating that a particular name in the sorted list is an alternate name for a name in the name set; and
         adding the particular name from the sorted list to a particular name set based at least in part on external information;
      receiving, from an electronic device, a request for the digital supplemental information file, wherein the digital supplemental information file comprises a visual representation of locations within the digital work where at least one name of the names in the one or more name sets occur, wherein the visual representation comprises an object with markings, each of the markings corresponding to a respective occurrence; and
      sending the digital supplemental information file to the electronic device, the digital supplemental information file altering functionality of the digital work to include at least one selectable portion that enables display of the visual representation of the locations within the digital work.

8. The method as recited in claim 7, wherein a plurality of the name sets each include at least one unique name that is present in only one of the name sets and at least one non-unique name that is present in the plurality of name sets, the method further comprising:
   identifying a particular name set of the plurality of name sets to which a particular occurrence of the non-unique name belongs based, at least in part, on a proximity of the particular occurrence of the non-unique name to an occurrence of a unique name from one of the plurality of name sets containing the non-unique name.

9. The method as recited in claim 7, further comprising, for a particular name set that includes multiple different names corresponding to a respective entity, selecting a representative name from the particular name set based at least in part on a precedence order.

10. The method as recited in claim 9, further comprising determining that the representative name is not included in any other name set.

11. The method as recited in claim 9, wherein the precedence order gives priority to selecting the representative name that includes a suffix.

12. The method as recited in claim 11, further comprising determining that no name in the name set includes a suffix, wherein the precedence order gives priority, at least in part, to selecting the representative name that is fuller than other names in the name set.

13. The method as recited in claim 7, wherein sorting the names obtained from the digital work further comprises sorting the names so that fuller names are toward a beginning of the sorted list and less full names are toward an end of the sorted list.

14. The method as recited in claim 7, further comprising:
   selecting a name from the beginning of the sorted list to generate a particular name set;
   traversing to the end of the sorted list at least once to determine whether one or more names in the sorted list correspond to one or more names in the particular name set; and
   adding the particular name from the sorted list to the particular name set if the particular name corresponds to at least one name in the name set.

15. The method as recited in claim 7, wherein adding the particular name further comprises determining that the particular name in the sorted list matches at least part of the at least one name in the name set.

16. The method as recited in claim 7, wherein the information includes at least one of:
   a list of nicknames; or
   information related to at least one of the particular name in the sorted list or the at least one name in the name set obtained from a network accessible resource.

17. The method as recited in claim 7, wherein each name of the names is associated with location information identifying a location in the digital work of each occurrence of the name.

18. The method as recited in claim 17, further comprising:
parsing the text of the digital work into a plurality of tokens, each token corresponding to at least one of a word or a punctuation mark;
determining token location information for the tokens; and
associating the location information with each name of the names based, at least in part, on the token location information.

19. The method as recited in claim 7, wherein the respective entity is at least one of:
a character in the digital work;
a person mentioned in the digital work;
a place mentioned in the digital work;
a thing mentioned in the digital work; or
an organization mentioned in the digital work.

20. The method as recited in claim 7, further comprising including at least one human-curated name set with the one or more name sets generated from the names, the human-curated name set including names added by a human to the human-curated name set.

21. A system comprising:
one or more processors;
one or more non-transitory computer-readable media; and
one or more modules maintained on the one or more non-transitory computer-readable media to be executed by the one or more processors to perform operations including:
obtaining a plurality of names from a digital work;
generating a digital supplemental information file comprising a first name set and a second name set relating to the plurality of names, the first name set and the second name set generated by:
selecting a first name from the plurality of names to generate a first name set; and
selecting a second name from the plurality of names to generate the second name set;
adding a third name to either the first name set or the second name set if the third name corresponds to the first name or the second name;
determining that the third name corresponds to both the first name set and the second name set;
determining a proximity in the digital work of the third name to an occurrence of a first name and an occurrence the second name; and
identifying whether the third name belongs to the first name set or the second name set based, at least in part, on the proximity;
receiving, from an electronic device, a request for the digital supplemental information file, wherein the digital supplemental information file comprises a visual representation of locations within the digital work where at least one name of the plurality of names in the first name set occur, wherein the visual representation comprises an object with markings, each of the markings corresponding to a respective occurrence; and
sending the digital supplemental information file to the electronic device, the digital supplemental information file altering functionality of the digital work to include at least one selectable portion that enables display of the visual representation of the locations within the digital work.

22. The system as recited in claim 21, the operations further comprising, prior to the generating, sorting the plurality of names obtained from the digital work into a sorted list so that fuller names containing more information are toward a beginning of the sorted list.

23. The system as recited in claim 22, wherein the operation of selecting the first name and the second name to generate the first name set and the second name set further comprises selecting a fuller name from the beginning of the sorted list.

24. The system as recited in claim 21, the operations further comprising traversing the plurality of names multiple times until no more names are added to the first name set or the second name set.

25. The system as recited in claim 21, the operations further comprising selecting a representative name based, at least in part, on a fullness of the representative name where there are multiple different names in either the first name set or the second name set.

26. The system as recited in claim 21, wherein identifying whether the third name belongs to the first name set or the second name set is based at least in part on one of:
external information obtained from a source external to the digital work that indicates the third name is an alternate name for the first name or the second name; or
the third name matches at least part of the first name or the second name.

* * * * *